United States Patent
Ogasawara

(10) Patent No.: US 8,316,405 B2
(45) Date of Patent: Nov. 20, 2012

(54) PRESENCE INFORMATION SHARING APPARATUS, PRESENCE INFORMATION SHARING METHOD, PRESENCE INFORMATION SHARING PROGRAM AND PRESENCE INFORMATION SHARING SYSTEM

(75) Inventor: Koichi Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/650,616

(22) Filed: Dec. 31, 2009

(65) Prior Publication Data

US 2010/0175100 A1 Jul. 8, 2010

(30) Foreign Application Priority Data

Jan. 6, 2009 (JP) ................... P2009-001158

(51) Int. Cl.
*H04N 7/173* (2011.01)
(52) U.S. Cl. ......... 725/110; 725/114; 725/135; 725/136
(58) Field of Classification Search .................. 725/110, 725/114, 135–136
See application file for complete search history.

(56) References Cited

U.S. PATENT DOCUMENTS

| | | | |
|---|---|---|---|
| 2002/0144273 A1* | 10/2002 | Reto | 725/86 |
| 2003/0014752 A1* | 1/2003 | Zaslavsky et al. | 725/40 |
| 2004/0231003 A1* | 11/2004 | Cooper et al. | 725/135 |
| 2006/0087553 A1* | 4/2006 | Kenoyer et al. | 348/14.08 |
| 2006/0282851 A1* | 12/2006 | Errico et al. | 725/39 |
| 2007/0288627 A1* | 12/2007 | Abella et al. | 709/224 |
| 2007/0294397 A1* | 12/2007 | Kunz | 709/224 |
| 2008/0005238 A1* | 1/2008 | Hall et al. | 709/204 |
| 2008/0311894 A1* | 12/2008 | Klein et al. | 455/414.2 |
| 2009/0106700 A1* | 4/2009 | Nobori et al. | 715/838 |
| 2009/0210358 A1* | 8/2009 | Chang et al. | 705/500 |

FOREIGN PATENT DOCUMENTS

| | | |
|---|---|---|
| JP | 2002 300616 | 10/2002 |
| JP | 2006 319389 | 11/2006 |
| JP | 2007 110399 | 4/2007 |
| JP | 2008 17136 | 1/2008 |

* cited by examiner

*Primary Examiner* — Pankaj Kumar
*Assistant Examiner* — Mulugeta Mengesha
(74) *Attorney, Agent, or Firm* — Frommer Lawrence & Haug LLP; William S. Frommer; Ellen Marcie Emas

(57) ABSTRACT

A presence information sharing apparatus is provided which includes a video acquiring unit for acquiring predetermined video contents from a content distribution server, a status information notifying unit for transmitting presence information containing acquisition source information on video contents acquired from the content distribution server to a presence server via a communication network, a status information acquiring unit for acquiring presence information transmitted by at least one another user from the presence server, a presence video acquiring unit for acquiring a video of video contents being viewed by the another user as a presence video from the content distribution server based on the acquisition source information contained in the presence information received by the status information acquiring unit, and a display controlling unit for displaying the video contents being acquired by the video acquiring unit and the presence video being acquired by the presence video acquiring unit on a display.

12 Claims, 18 Drawing Sheets

FIG. 5
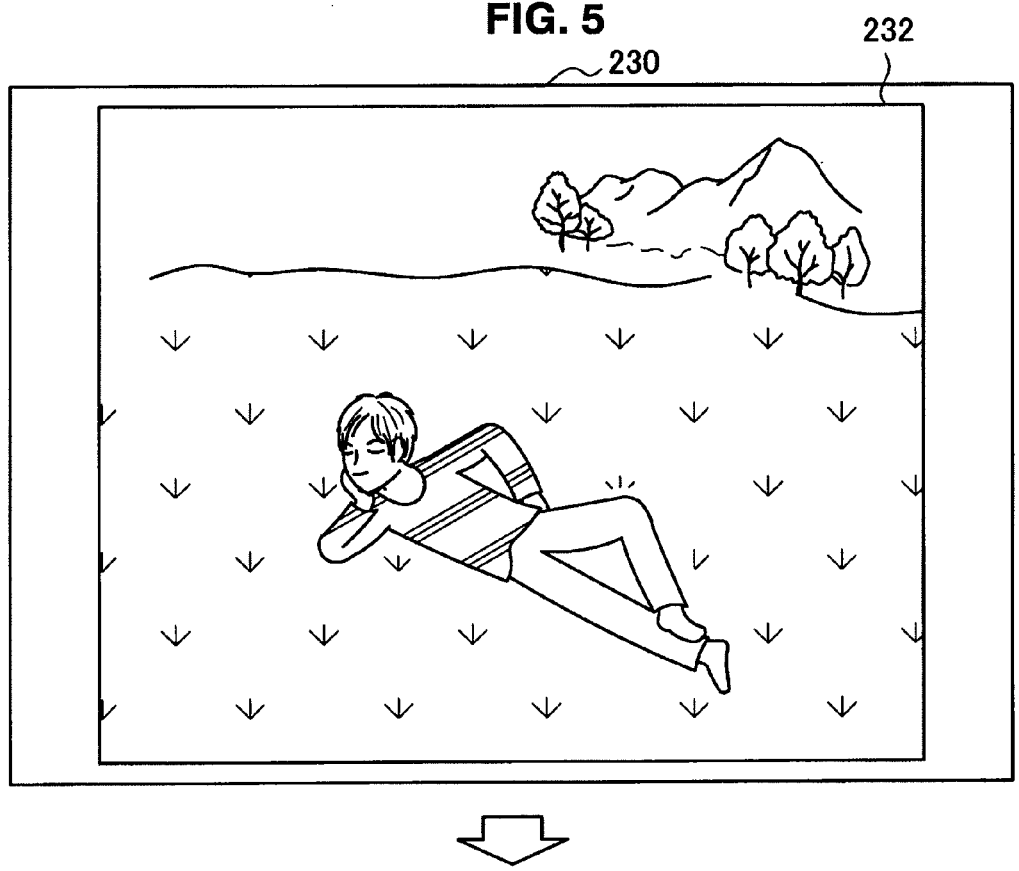
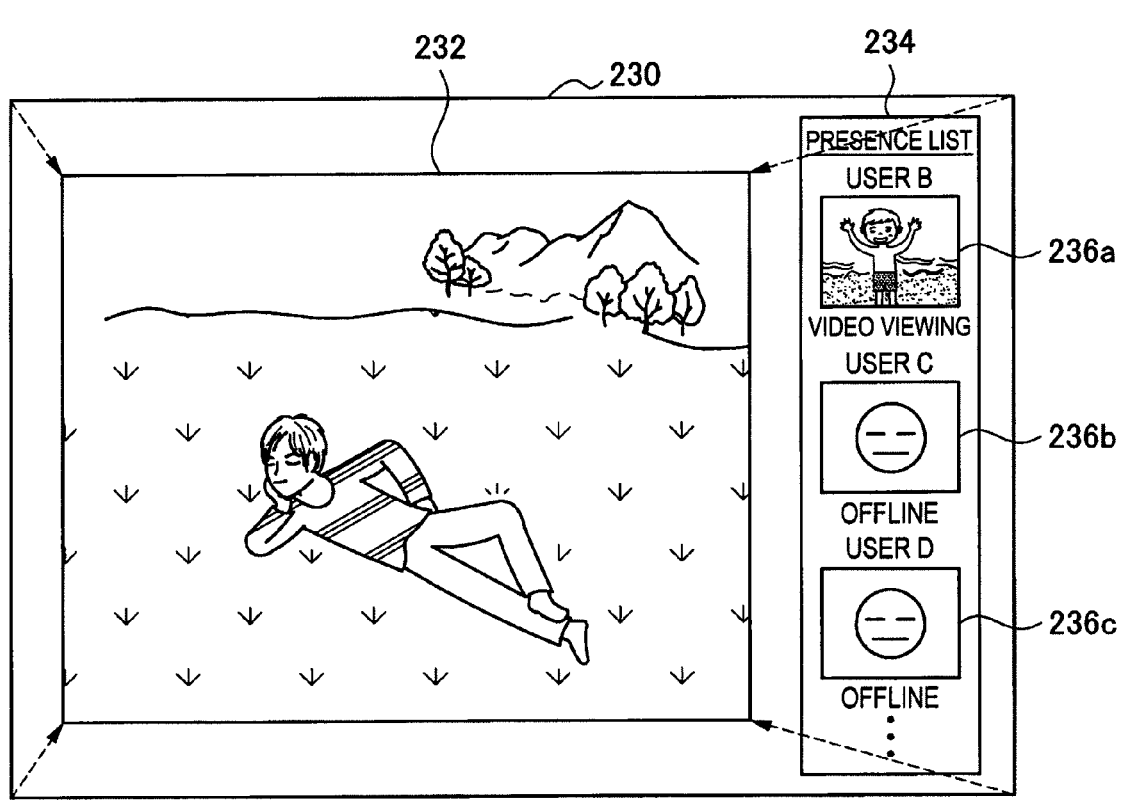

FIG. 6
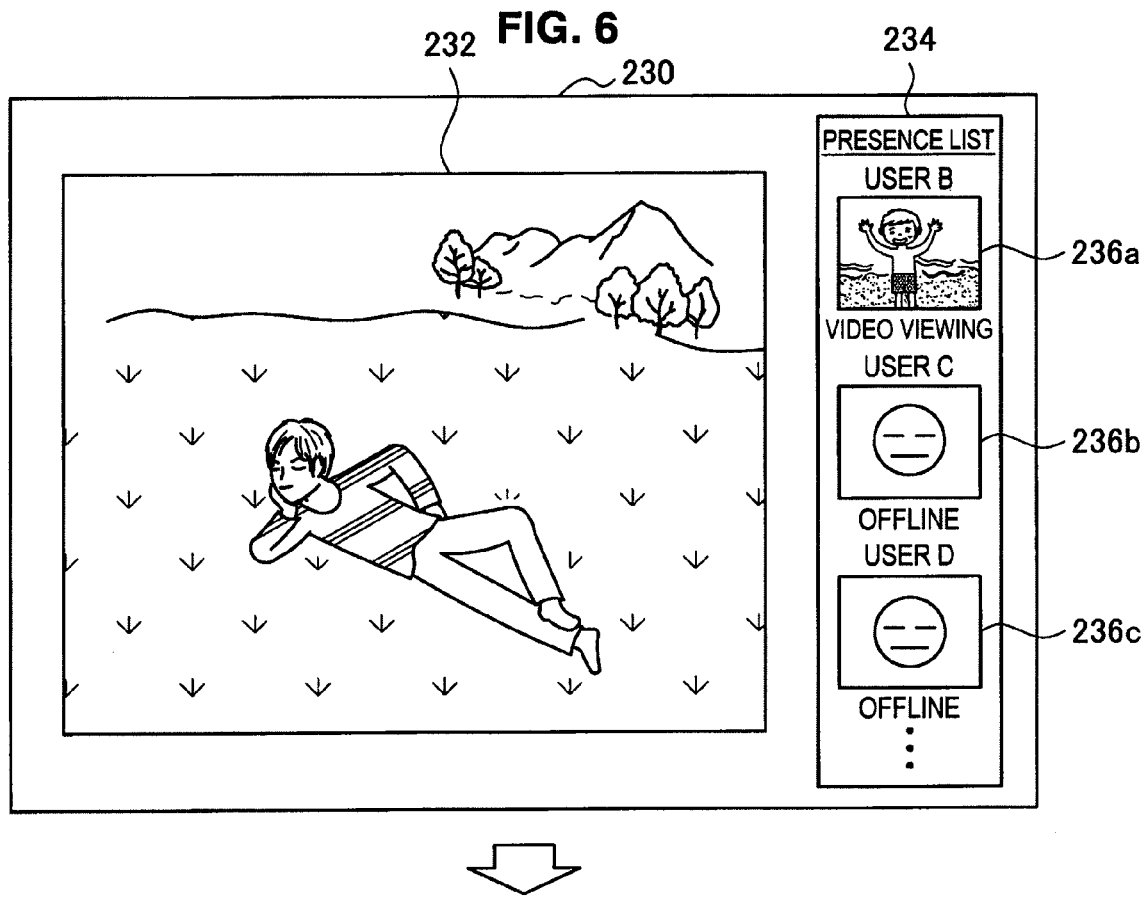
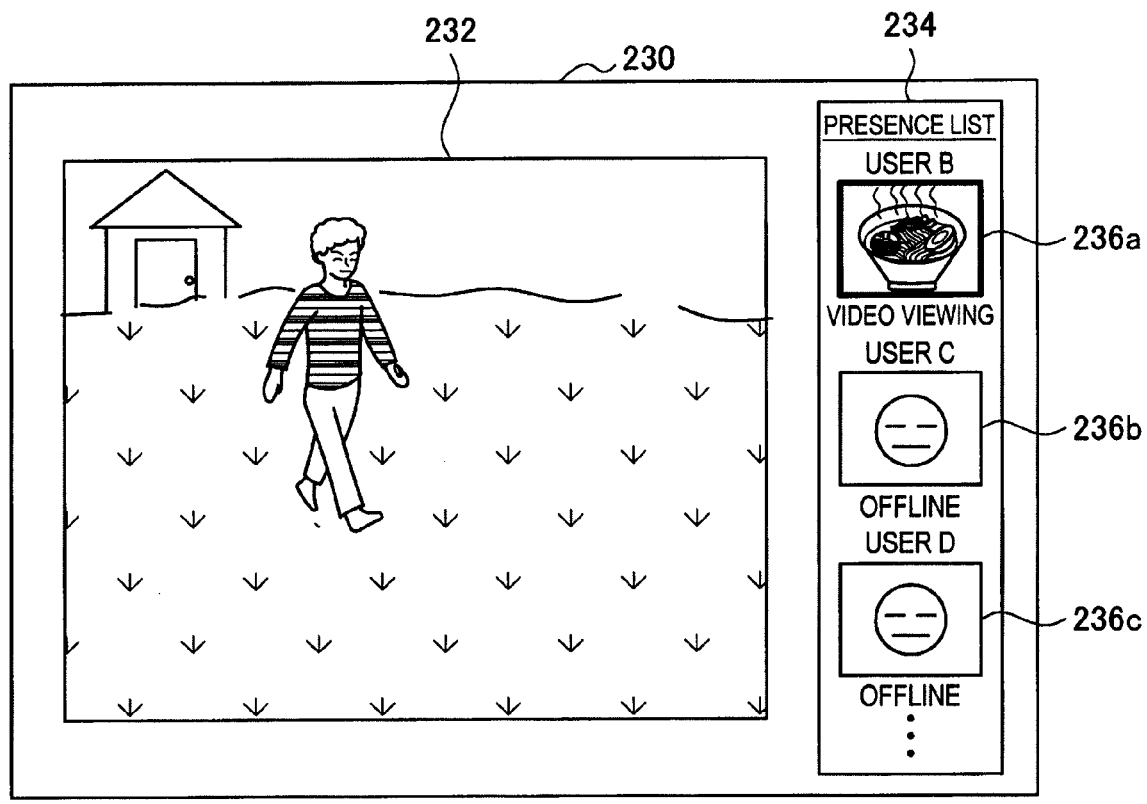

FIG. 8
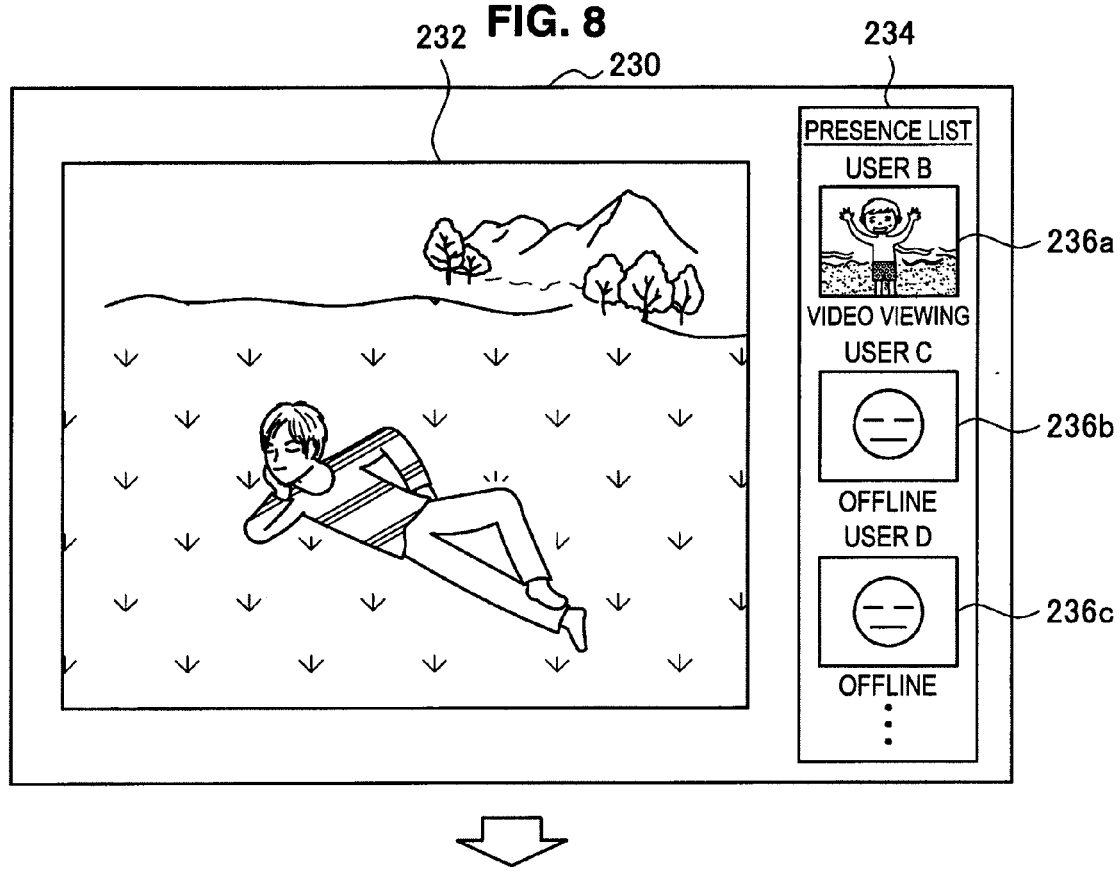
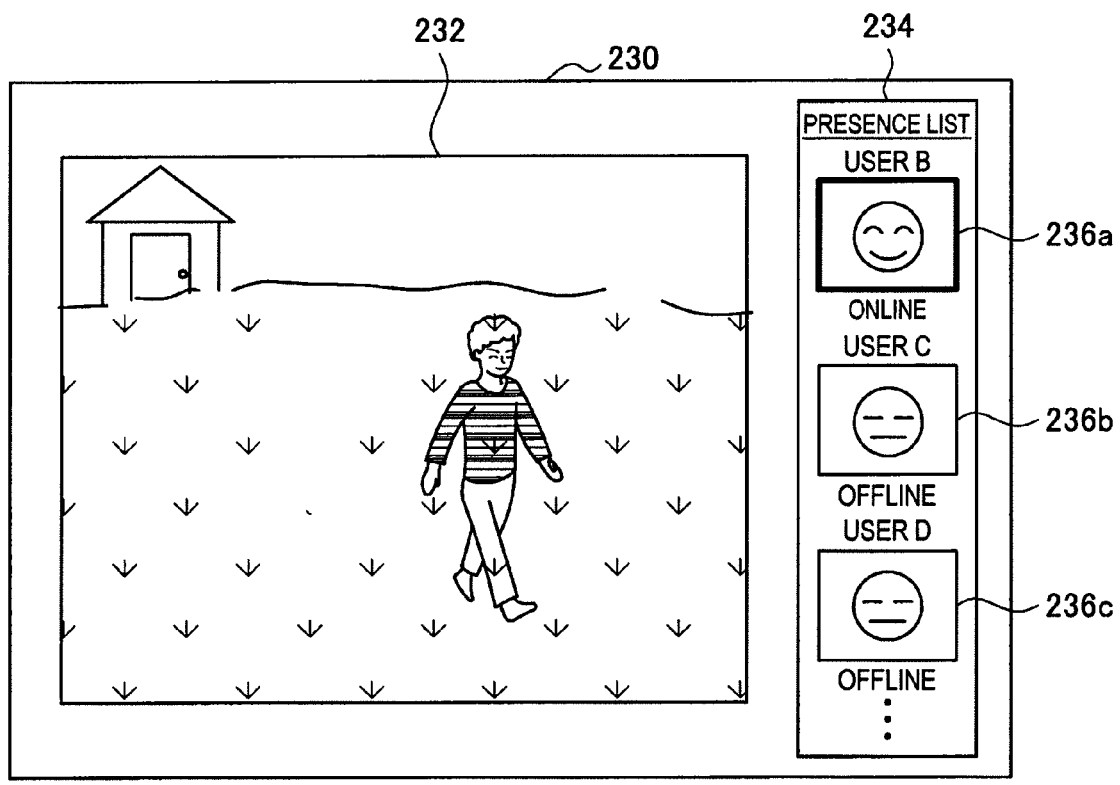

FIG. 10
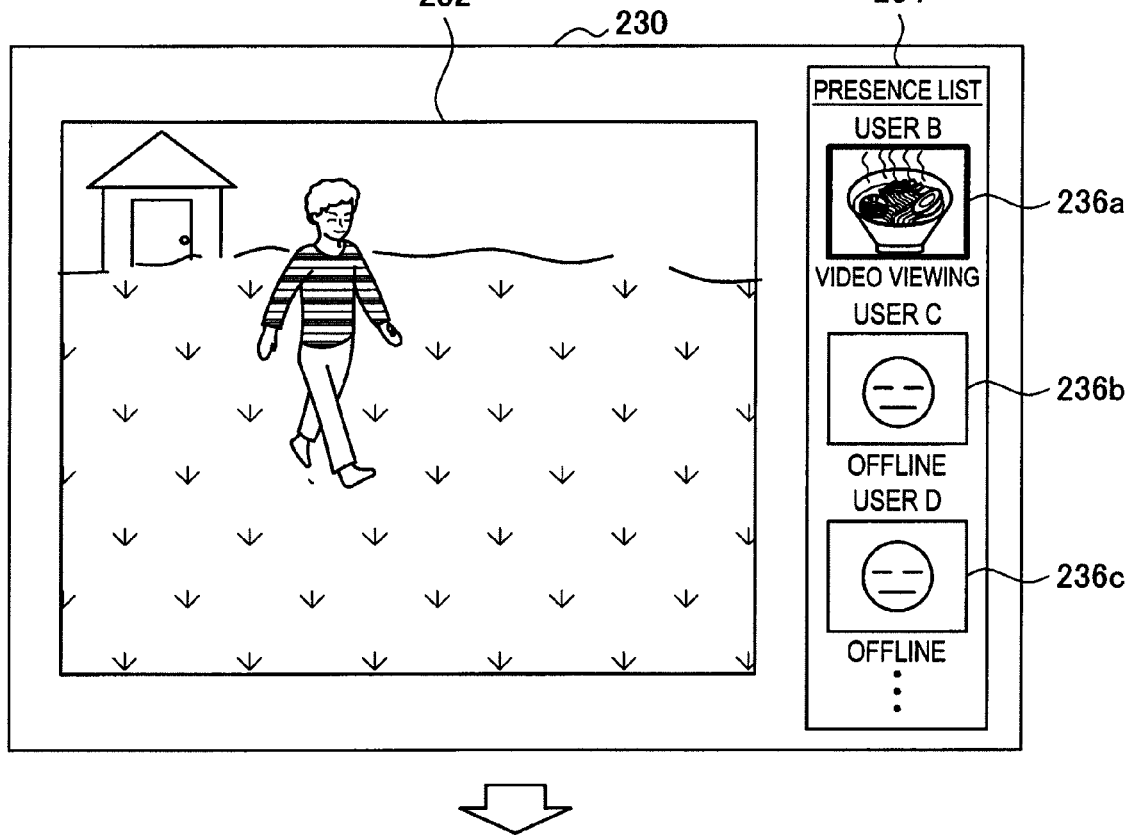
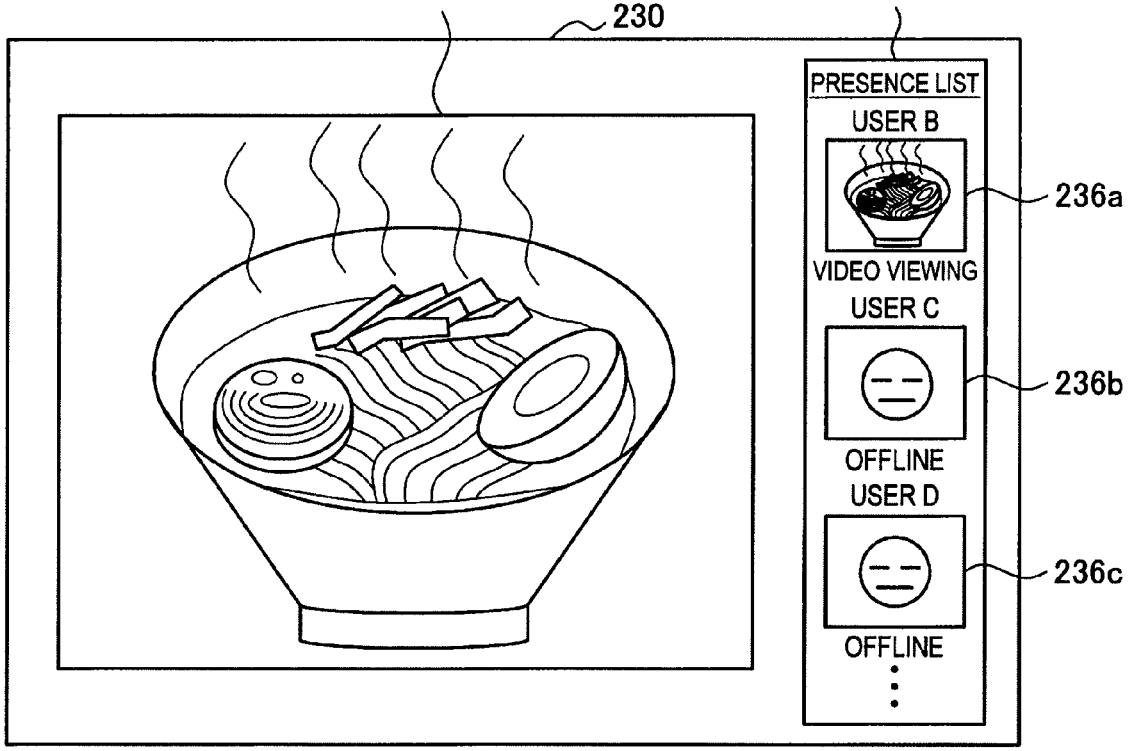

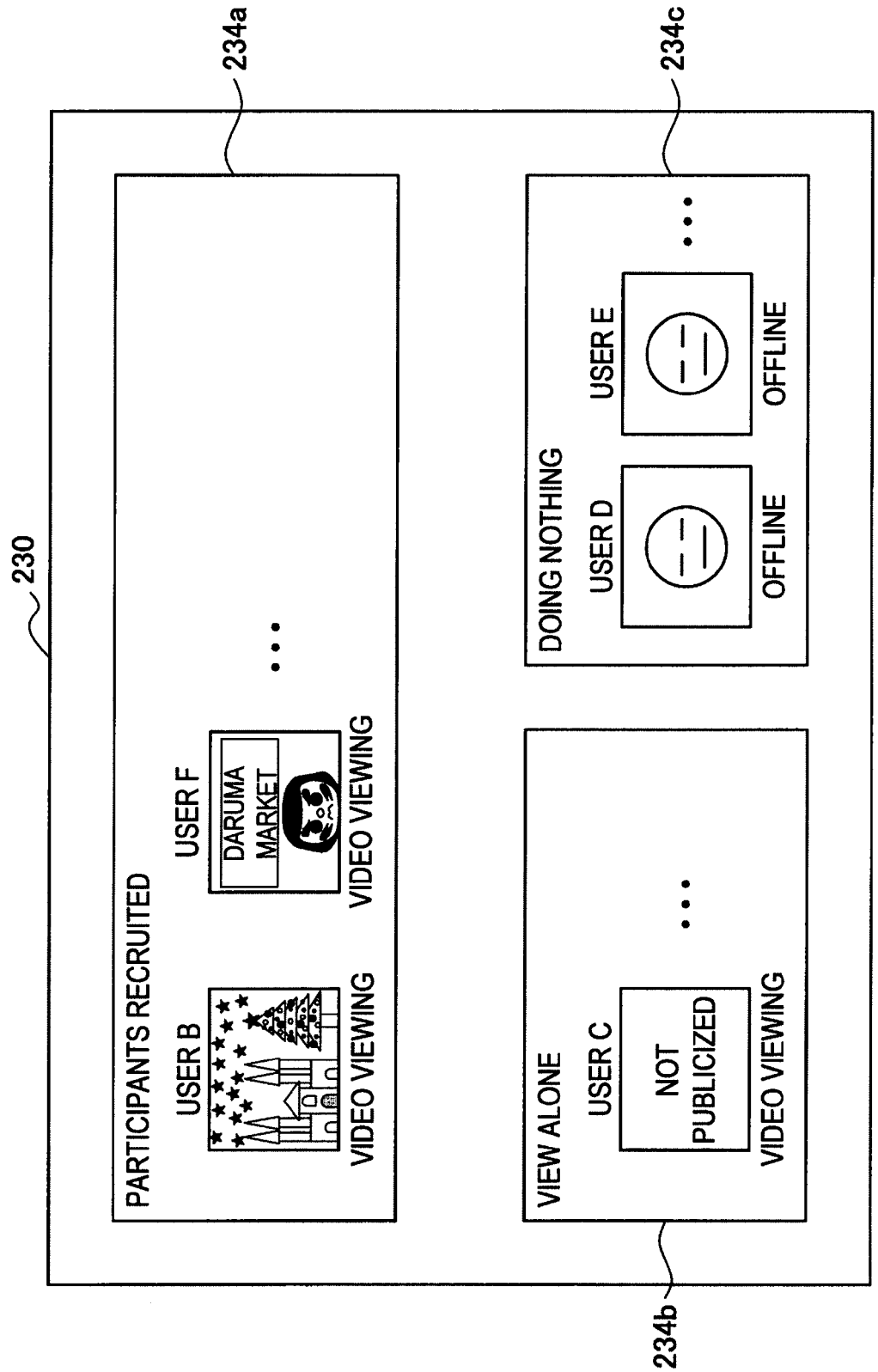

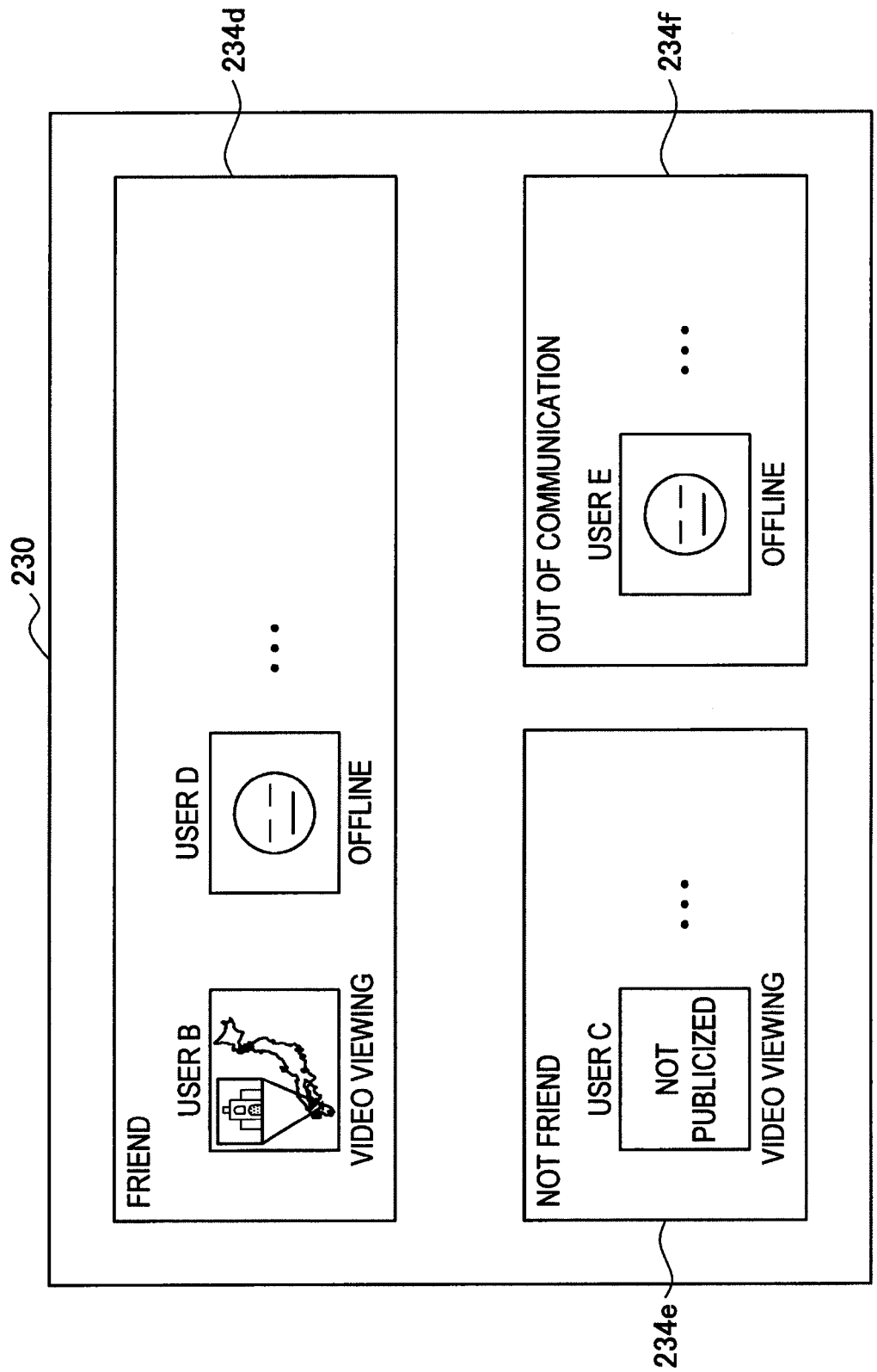

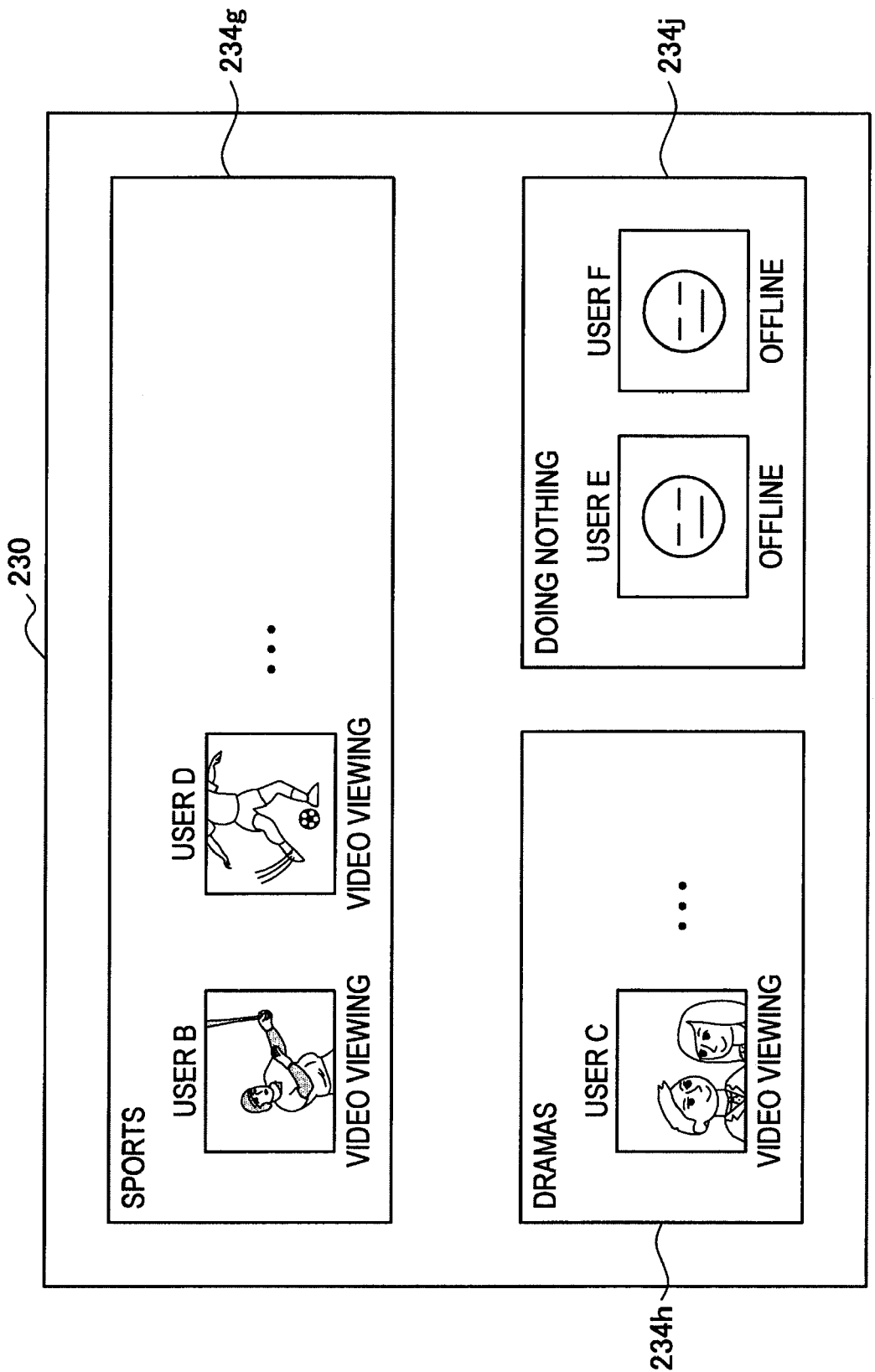

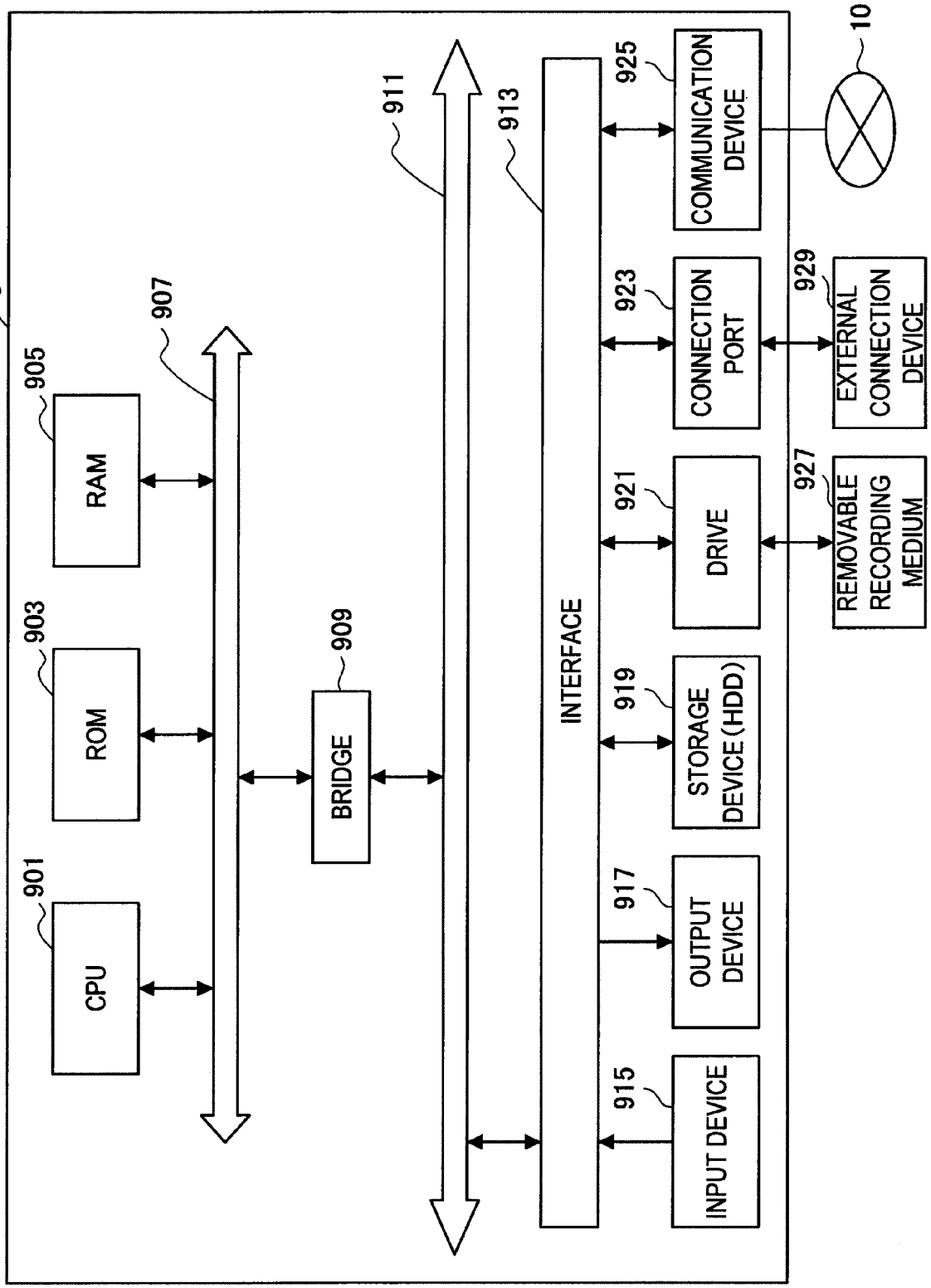

PRESENCE INFORMATION SHARING APPARATUS, PRESENCE INFORMATION SHARING METHOD, PRESENCE INFORMATION SHARING PROGRAM AND PRESENCE INFORMATION SHARING SYSTEM

BACKGROUND OF THE INVENTION

1. Field of the Invention

The present invention relates to a presence information sharing apparatus, presence information sharing method, presence information sharing program and presence information sharing system.

2. Description of the Related Art

In recent years, there has been known an instant messaging (IM) service for exchanging messages while confirming a communication party's status over a communication network. A user of the IM can present information on his/her status (presence information) to a communication party for convenient message exchange with the communication party. The presence information includes text information, image information and the like indicating a user's status such as "present", "absent" and "busy". The user of the IM can determine a party's status and transmit a message while checking party's presence information.

Japanese Patent Application Laid-Open No. 2006-319389 discloses therein a technique for acquiring presence information on a previously-registered user and two-dimensionally displaying contents selectable for each user on a display in matrix in a content sharing communication system. Thus, the user can confirm contents communicable with each user and then make communication with his/her desired user.

SUMMARY OF THE INVENTION

However, in a communication system in related art described in Japanese Patent Application Laid-Open No. 2006-319389, the presence information is utilized only to cause a user to recognize a party's current status. For example, the user can confirm, based on the presence information, how the party has viewed contents. However, the user needs to confirm the acquisition source of the video contents and additionally acquire the video contents from the acquisition source via a network in order to view the party's viewing video contents. In other words, there was an issue that the presence information is merely a trigger for sharing the contents and the user may not directly utilize the presence information to share the contents with the party.

In light of the foregoing, it is desirable for the present invention to provide a novel and improved presence information sharing apparatus, presence information sharing method, presence information sharing program and presence information sharing system capable of sharing contents with each user by directly utilizing presence information to acquire the video contents being viewed by each user.

According to an embodiment of the present invention, there is provided a presence information sharing apparatus including a video acquiring unit for acquiring predetermined video contents from a content distribution server, a status information notifying unit for transmitting presence information containing acquisition source information on video contents acquired from the content distribution server to a presence server via a communication network, a status information acquiring unit for acquiring presence information transmitted by at least one another user from the presence server, a presence video acquiring unit for acquiring a video of video contents being viewed by the another user as a presence video from the content distribution server based on the acquisition source information contained in the presence information received by the status information acquiring unit, and a display controlling unit for displaying the video contents being acquired by the video acquiring unit and the presence video being acquired by the presence video acquiring unit on a display.

With the configuration, the video acquiring unit of the presence information sharing apparatus can acquire predetermined video contents from the content distribution server. Further, the status information notifying unit can transmit the presence information containing the acquisition source information on the video contents acquired from the content distribution server to the presence server via the communication network. The status information acquiring unit can acquire the presence information transmitted by at least one another user from the presence server. The presence video acquiring unit can acquire a video of the video contents being viewed by other user as a presence video from the content distribution server based on the acquisition source information contained in the presence information received by the status information acquiring unit. Furthermore, the display controlling unit can display the video contents being acquired by the video acquiring unit and the presence video being acquired by the presence video acquiring unit on the display.

The display controlling unit may display, on the display, a view content display region for displaying therein the video contents being acquired by the video acquiring unit, and a presence information display region for displaying therein at least one presence video being acquired by the presence video acquiring unit.

A resolution of the presence video may be lower than a resolution of the video contents.

When the predetermined presence video being displayed in the presence information display region is selected by a user, the video acquiring unit may interrupt the acquisition of the video contents from the content distribution server and may newly acquire video contents corresponding to the user-selected presence video from the content distribution server, and the display controlling unit may display the video contents newly acquired by the video acquiring unit in the view content display region.

The presence information sharing apparatus may further include a communication processing unit for, when the predetermined presence video being displayed in the presence information display region is selected by a user, establishing a session necessary for communication with another user viewing video contents corresponding to the user-selected presence video.

The communication processing unit may transmit predetermined audio information or message information to a presence information sharing apparatus utilized by the another user in response to a user's instruction after the session is established.

When the communication processing unit transmits the audio information or the message information to a predetermined user after the session is established, the status information notifying unit may transmit presence information containing information on a status of communication with the predetermined user via the presence server to another user with which the session is not established.

When the predetermined presence video being displayed in the presence information display region is selected by a user, the presence video acquiring unit may interrupt the acquisition of the presence video from the content distribution server, and the display controlling unit may display only the view content display region on the display.

The display controlling unit may display a presence information display frame for displaying the presence video being acquired by the presence video acquiring unit for each user in the presence information display region.

The display controlling unit may classify the at least one presence video and may display the same in the presence video display region based on predetermined information contained in the at least one item of presence information acquired from the presence server.

The status information notifying unit may contain category information on video contents acquired from the content distribution server in the presence information and may transmit the same to the presence server via the communication network, and the display controlling unit may display the at least one presence video in the presence video display region for each category based on the category information contained in the at least one item of presence information acquired from the presence server.

The display controlling unit may classify the at least one presence video being acquired by the presence video acquiring unit depending on the frequency at which the session is established by the communication processing unit, and may display the same in the presence video display region.

According to another embodiment of the present invention, there is provided a presence information sharing method including the steps of acquiring predetermined video contents from a content distribution server, transmitting presence information containing acquisition source information on video contents acquired from the content distribution server to a presence server via a communication network, acquiring presence information transmitted by at least one another user from the presence server, acquiring a video of video contents being viewed by the another user as a presence video from the content distribution server based on the acquisition source information contained in the presence information received in the status information acquiring step, and displaying the video contents being acquired in the video acquiring step and the presence video being acquired in the presence video acquiring step on a display.

According to another embodiment of the present invention, there is provided a presence information sharing program for causing a computer to execute a video acquisition processing of acquiring predetermined video contents from a content distribution server, a status information notification processing of transmitting presence information containing acquisition source information on video contents acquired from the content distribution server to a presence server via a communication network, a status information acquisition processing of acquiring presence information transmitted by at least one another user from the presence server, a presence video acquisition processing of acquiring a video of video contents being viewed by the another user as a presence video from the content distribution server based on the acquisition source information contained in the presence information received in the status information acquisition processing, and a display control processing of displaying the video contents being acquired in the video acquisition processing and the presence video being acquired in the presence video acquisition processing on a display.

According to another embodiment of the present invention, there is provided a presence information sharing system including a content distribution server for distributing predetermined video contents, a presence server for managing presence information, and a presence information sharing apparatus, the presence information sharing apparatus including a video acquiring unit for acquiring predetermined video contents from the content distribution server, a status information notifying unit for transmitting presence information containing acquisition source information on video contents acquired from the content distribution server to the presence server via a communication network, a status information acquiring unit for acquiring presence information transmitted by at least one another user from the presence server, a presence video acquiring unit for acquiring a video of video contents being viewed by the another user as a presence video from the content distribution server based on the acquisition source information contained in the presence information received by the status information acquiring unit, and a display controlling unit for displaying the video contents being acquired by the video acquiring unit and the presence video being acquired by the presence video acquiring unit on the display.

According to the embodiments of the present invention described above, a user directly utilizes presence information to acquire video contents being viewed by each user, thereby sharing the contents with each user.

BRIEF DESCRIPTION OF THE DRAWINGS

FIG. 5 is an explanatory diagram showing another display example of a presence video on the display 230 in the embodiment;

FIG. 6 is an explanatory diagram showing another display example of a presence video on the display 230 in the embodiment;

FIG. 8 is an explanatory diagram showing a display example on the display 230 when an instruction of finishing reproducing video contents is made in the embodiment;

FIG. 10 is an explanatory diagram showing a display example on the display 230 when a presence video is selected in the embodiment;

FIG. 15 is an explanatory diagram showing a display example of a presence video on the display 230 in variant 2;

FIG. 16 is an explanatory diagram showing another display example of a presence video on the display 230 in variant 2;

FIG. 17 is an explanatory diagram showing a display example of a presence video on the display 230 in variant 2; and FIG. 18 is a block diagram showing one example of a hardware configuration of the presence information sharing apparatus 200 according to the embodiment.

DETAILED DESCRIPTION OF THE EMBODIMENTS

Figure 1:
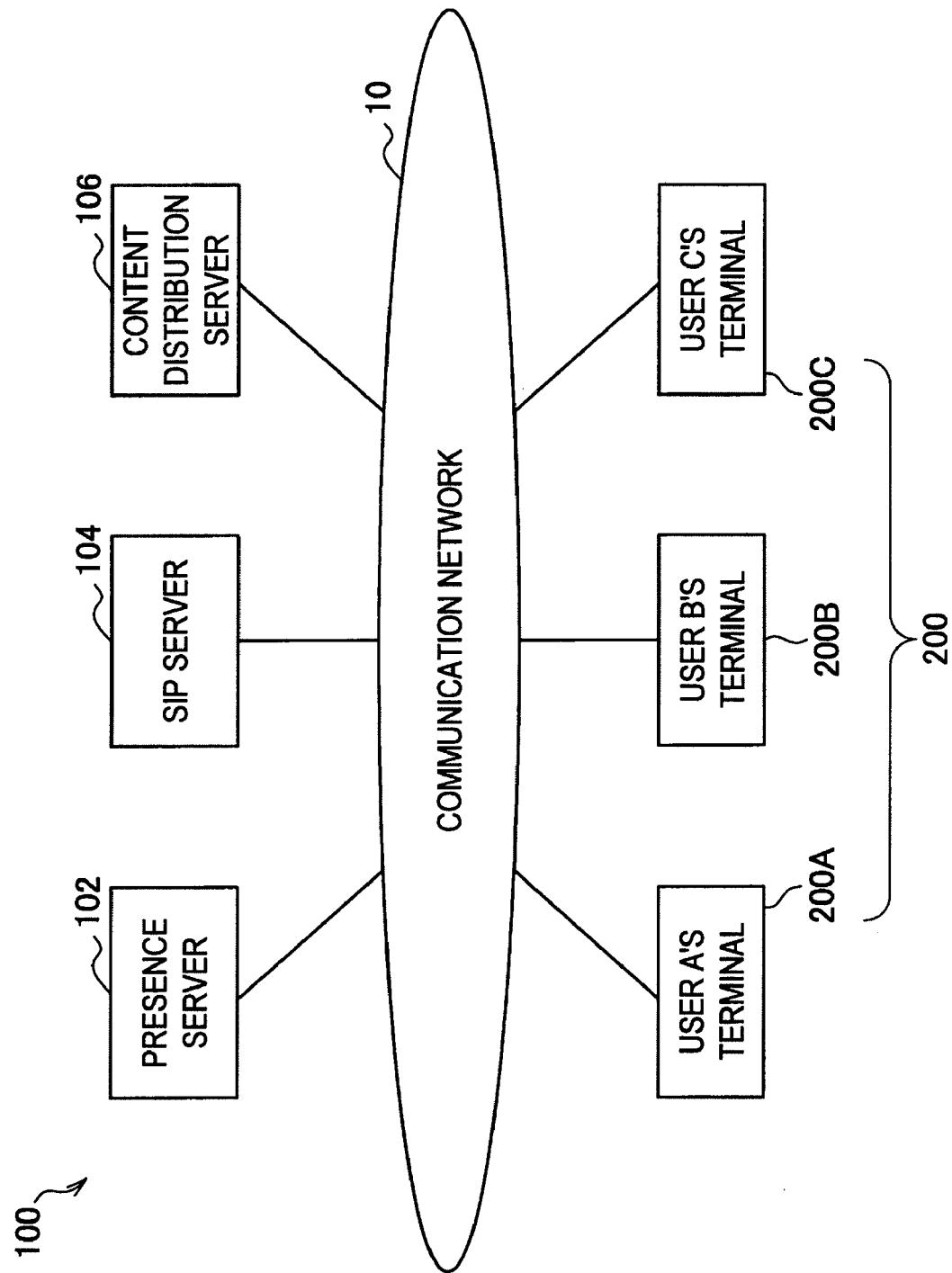
FIG. 1 is an explanatory diagram showing a schematic configuration of a presence information sharing system 100 according to an embodiment of the present invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted. The explanation will be made in the following order.

1. Outline of embodiment of the present invention
2. Schematic configuration of presence information sharing system 100 according to an embodiment
3. Functional configuration of presence information sharing apparatus 200 according to an embodiment
4. Processing sequence
4-1. Processing of acquiring presence video
4-2. Processing of interrupting video contents
4-3. Processing of switching video contents
4-4. Processing of starting communication
4-5. Processing of exchanging between multiple users
5. Variants
5-1. Variant 1 (example for restricting from publicizing information on video contents)
5-2. Variant 2 (example for classifying displays of presence information)
5-3. Variant 3 (example for utilizing presence information to distribute pay contents)
6. Hardware configuration of presence information sharing apparatus 200
7. Conclusions

1. OUTLINE OF EMBODIMENT OF THE PRESENT INVENTION

The outline of an embodiment will be described prior to describing an information processing apparatus according to the embodiment of the present invention in detail.

As stated above, there is known an instant messaging (IM) service for acquiring and displaying a communication party's status as presence information on a display to exchange messages while confirming a party's status. A user can acquire presence information on multiple users previously registered in a registration server, for example. Thus, the user can recognize the status such as "present", "absent" and "busy" for each user as communication party based on text information or image information displayed on a display.

The technique described in Japanese Patent Application Laid-Open No. 2006-319389 is utilized, so that the user can acquire and display on a display how a communication party has viewed video contents. However, the information displayed on the display is merely text information such as contents' title, or images such as previously-registered icons and title screens. Thus, the user may not confirm the contents of the video being viewed by the party.

Here, the user needs to confirm the acquisition source of the video contents and additionally acquire the video contents from the acquisition source via a network in order to view the same video contents as the communication party's. In other words, the user needed to additionally acquire the video contents in order to exchange call or messages while viewing the same video contents as the communication party's even when the user can recognize the current status of the communication party based on the presence information.

In this manner, there was an issue that when the contents are shared in a communication system in related art, the presence information is merely a trigger for sharing the contents and the user may not directly utilize the presence information to share the contents with the party.

The issue can be solved by utilizing a presence information sharing system 100 according to an embodiment of the present invention. Specifically, each user terminal (presence information sharing apparatus 200) in the presence information sharing system 100 transmits presence information containing information on the acquisition source (content distribution server 106) of the video contents being reproduced to a previously-registered user. In response thereto, the presence information sharing apparatus 200 which has acquired the presence information automatically acquire the video contents from the content distribution server 106 via a network based on the information on the acquisition source of the video contents contained in the presence information. Further, the presence information sharing apparatus 200 which has acquired the video contents displays the video contents on a display or the like, thereby viewing the video contents being viewed by the party at the same time. Thus, the user can recognize the video contents per se being viewed by the party.

When a request of acquiring the video contents is made by the presence information sharing apparatus 200 based on the presence information, the content distribution server 106 can transmit the presence video having a lower resolution than typical video contents to the presence information sharing apparatus 200. Thus, the presence information sharing apparatus 200 can display multiple video contents being viewed by multiple users as the presence video having a lower resolution on the display while the user-viewing video is being displayed. Thus, the presence information sharing apparatus 200 can display the presence video corresponding to the video contents being viewed by multiple users on the display also when a bandwidth of the communication network is narrow or many users are registered. Consequently, the user can view the video contents being currently viewed by multiple previously-registered users at the same time.

The presence information sharing apparatus 200 can acquire the video contents from the content distribution server 106 and acquire the video contents having a typical resolution when the user selects a predetermined presence video. Thus, the user can view the same video contents with any one user selected from multiple users at the same time. Further, the presence information sharing apparatus 200 may establish communication connection with the user via a SIP server 104 or the like when the user selects a predetermined presence video. Thus, the user can make call or message exchange with a user viewing the same video contents.

The presence information sharing system 100 having the above characteristics will be described below in detail.

2. SCHEMATIC CONFIGURATION OF PRESENCE INFORMATION SHARING SYSTEM 100 ACCORDING TO AN EMBODIMENT

FIG. 1 is an explanatory diagram showing a schematic configuration of the presence information sharing system 100 according to an embodiment of the present invention. As shown in FIG. 1, the presence information sharing system 100 includes a network (communication network) 10, a presence server 102, a SIP server 104, a content distribution server 106 and a presence information sharing apparatus (which may be referred to as user terminal below) 200. The respective constituents of the presence information sharing system 100 will be described below.

(Communication Network 10)

The communication network 10 is a communication line network for connecting the presence server 102, the SIP server 104, the content distribution server 106 and each user terminal 200 in a bidirectionally communicable manner or unidirectionally communicable manner. The communication network 10 is configured with a dedicated line network such as Internet, NGN (Next Generation Network), LAN (Local Area Network), IP-VPN (Internet Protocol-Virtual Private Network), Ethernet (registered trademark) and wireless LAN, irrespective of being wired or wireless.

(Presence Server 102)

The presence server 102 is directed for distributing presence information to each user terminal 200. The presence information is information on a user's current status (presence status) such as "online", "offline" "I'm out" or "busy". The information contained in the presence information is not limited thereto of course and can contain various items of information on a user's presence status.

The presence server 102 acquires the presence information from a user terminal 200 via the communication network 10 and transmits the acquired presence information to another user terminal 200 which registers the user terminal 200 as communication party. Thus, the presence server 102 needs to manage the information on registration situation between the user terminals 200. The presence server 102 can manage the information on registration situation between the user terminals 200 based on the registration information transmitted from each user terminal 200, for example.

For example, in the example shown in FIG. 1, there is assumed that a user A's terminal 200A, a user B's terminal 200B and a user C's terminal 200C are registered as communication party. When having acquired the presence information from the user A's terminal 200A, the presence server 102 transmits the presence information on the user A's terminal 200A to the user B's terminal 200B and the user C's terminal 200C which have registered the user A's terminal 200A as communication party. Thus, the user B and the user C can recognize the presence status of the user A.

The present embodiment is characterized in that information on the acquisition source of video contents is contained in the presence information provided by the presence server 102. In other words, the presence information transmitted from the user terminal 200 contains the information (acquisition source information on acquisition source server or address) on video contents being reproduced at the user terminal 200. Thus, the user terminal 200 which has acquired the presence information from the presence server 102 can acquire the video contents being reproduced at other user terminal 200 based on the information on the video contents contained in the presence information. In other words, the user terminals 200 can directly utilize the presence information to reproduce the same video contents at the same time. A flow of exchanging the presence information between each user terminal 200 and the presence server 102 or a processing flow of acquiring the video contents by the user terminal 200 will be described later in detail with reference to the sequence diagrams.

(SIP Server 104)

The SIP server 104 is directed for utilizing a protocol called as SIP (Session Initiation Protocol) to associate a phone number with an IP address or to call a party for call control. In other words, the SIP server 104 controls the start, change and end of the communication session between the respective user terminals 200 according to the SIP.

In the present embodiment, communication such as call or messaging is made between the user terminals 200 via the SIP server 104. For example, in the example shown in FIG. 1, when selecting the video contents being reproduced at the user B's terminal 200B, which is being displayed at the user A's terminal 200A, the user A transmits a request of starting to communicate with the user B to the SIP server 104. In response thereto, the SIP server 104 establishes a session between the user A's terminal 200A and the user B's terminal 200B. Consequently, the user A and the user B can make communication such as call or messaging. A processing flow in which each user terminal 200 makes communication via the SIP server 104 will be described later in detail with reference to the sequence diagrams.

(Content Distribution Server 106)

The content distribution server 106 is directed for distributing predetermined video contents to each user terminal 200 via the communication network 10 in response to a user's request. The content distribution server 106 can manage predetermined video contents in association with predetermined address information, ID or the like, for example. The user inputs predetermined address information, ID or the like into the user terminal 200, for example, thereby requesting the content distribution server 106 to acquire the predetermined video contents. In response thereto, the content distribution server 106 can transmit the predetermined video contents associated with the address information, ID or the like, which has been transmitted from the user terminal 200, to the user terminal 200.

In the present embodiment, the content distribution server 106 is characterized by managing the presence video in addition to typical video contents. The presence video is video contents having the same contents as the typical video contents but having a lowered resolution by predetermined rate. The rate of lowering the resolution can be arbitrarily set depending on the bandwidth of the communication network 10, the number of user terminals 200, or the like, for example. Naturally, if a margin is present at the band of the communication network 10, the presence video may be transmitted to the user terminal 200 without being lowered in its resolution. A flow of the processing in which the content distribution server 106 distributes video contents and presence video to each user terminal 200 will be described later in detail with reference to the sequence diagrams.

(User Terminal 200)

The user terminal 200 is a presence information sharing apparatus for acquiring presence information from the presence server 102 or acquiring predetermined video contents from the content distribution server 106. The user terminal 200 transmits the presence information containing at least information on the video contents being currently reproduced to the presence server 102 via the communication network 10. The user terminal 200 acquires the presence information on at least one user terminal 200 utilized by another user from the presence server 102. The user terminal 200 acquires the presence video from the content distribution server 106 based on the information on the video contents contained in the presence information acquired from the presence server 102. The user terminal 200 establishes a communication session with another user terminal 200 via the SIP server 104.

The user terminal 200 is not limited to a specific apparatus as long as it is connectable with the presence server 102, the SIP server 104 and the content distribution server 106 via the communication network 10. The user terminal 200 may be installed a display for reproducing the video contents acquired from the content distribution server 106, or software for IP phone for communicating with other user terminal 200. Such a user terminal 200 assumes a personal computer, PDA, game device, TV receiver and the like, for example, but the present invention is not limited thereto. For example, the user terminal 200 may not necessarily include a display for reproducing video contents, and may reproduce video contents on a display externally connected to the user terminal 200. Further, the user terminal 200 can communicate with other user terminal 200 by being additionally connected to an IP phone or the like, of course.

There have been described above the respective constituents of the presence information sharing system 100 according to the present embodiment. Next, the presence information sharing apparatus 200 (user terminal 200) as one characteristic of the presence information sharing system 100 according to the present embodiment will be described below in detail.

3. FUNCTIONAL CONFIGURATION OF PRESENCE INFORMATION SHARING APPARATUS 200 ACCORDING TO AN EMBODIMENT

Figure 2:
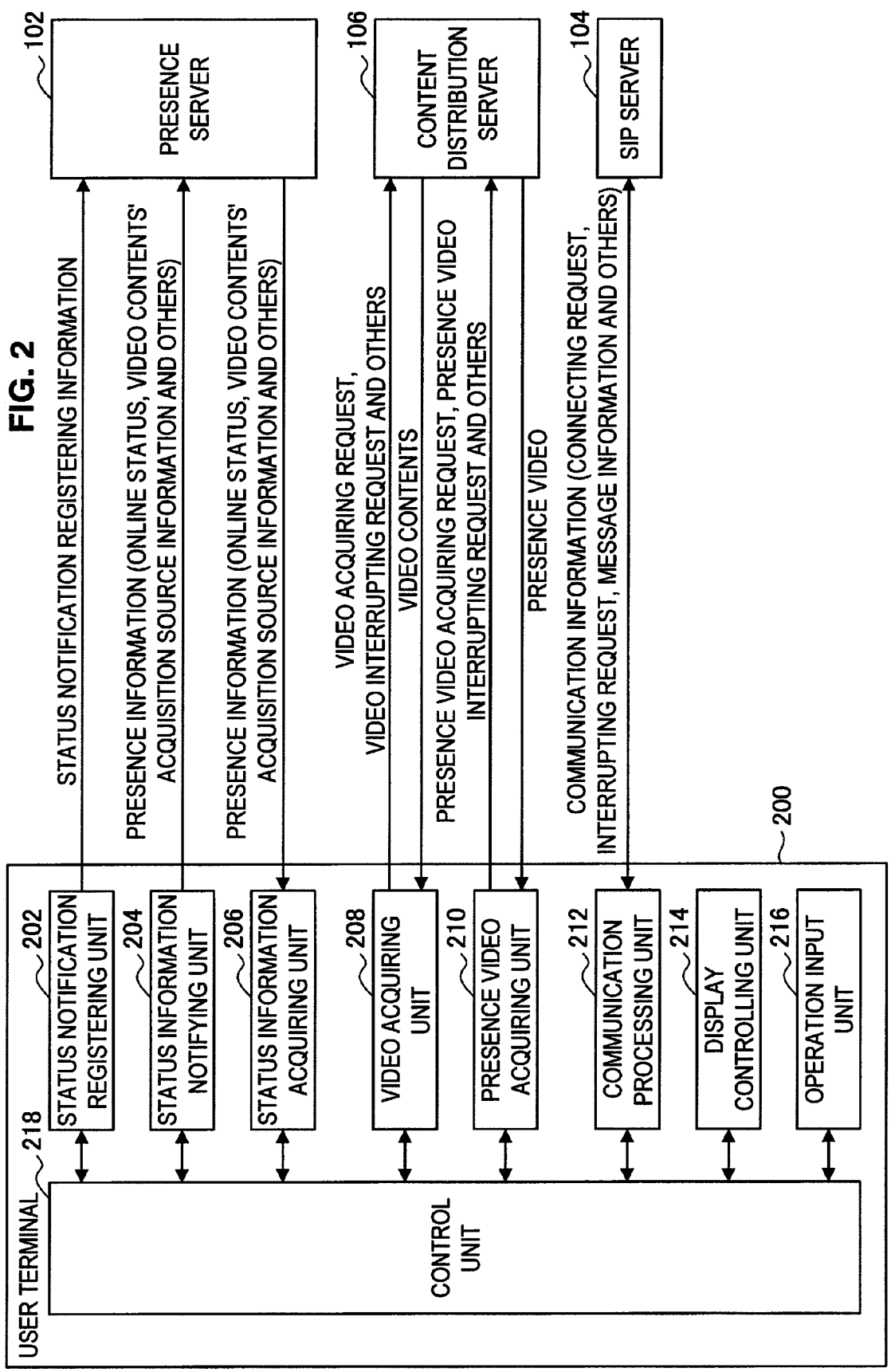
FIG. 2 is a block diagram showing one example of a functional configuration of a presence information sharing apparatus 200 according to the embodiment.

FIG. 2 is a block diagram showing one example of a functional configuration of the presence information sharing apparatus 200 (user terminal 200) according to the present embodiment. As shown in FIG. 2, the user terminal 200 includes a status notification registering unit 202, a status information notifying unit 204, a status information acquiring unit 206, a video acquiring unit 208, a presence video acquiring unit 210, a communication processing unit 212, a display controlling unit 214 and an operation input unit 216. These functional configuration units configuring the user terminal 200 are controlled by a control unit 218 to perform various functions. The functional configuration units configuring the user terminal 200 according to the present embodiment will be described below in detail.

(Status Notification Registering Unit 202)

The status notification registering unit 202 registers information on a user terminal 200 with which a user wants to share video contents in the presence server 102. The status notification registering unit 202 transmits the information on the user terminal 200 with which a user wants to share the presence information, as status notification registering information, to the presence server 102 in response to a user's instruction. In response thereto, the presence server 102 can manage the exchange of the presence information between multiple user terminals 200 based on the status notification registering information. Thus, the user can previously register the information on each user terminal 200 in the presence server 102 such that the presence information can be shared between friends or in-company user terminals 200.

(Status Information Notifying Unit 204)

The status information notifying unit 204 transmits the presence information to the presence server 102 when the current status of the user terminal 200 changes. The presence information to be transmitted by the status information notifying unit 204 contains information on whether the user terminal 200 is on line or off line, or information appropriately input by the user such as "break time", "busy" and "meeting".

The status information notifying unit 204 according to the present embodiment is characterized by, when acquiring and reproducing video contents from the content distribution server 106, transmitting the presence information containing the information on the acquisition source of the contents to the presence server 102.

The status information notifying unit 204 can transmit the presence information to the presence server 102 when the current status of the user terminal 200 changes. For example, when the user terminal 200 is powered on, the status information notifying unit 204 transmits the presence information indicating that the user terminal 200 is on line to the presence server 102. Further, when the user inputs the status "break time" on being away from the user terminal 200, the status information notifying unit 204 transmits the presence information indicating that the current status is "break time" to the presence server 102. In the present embodiment, when new video contents are acquired and reproduced from the content distribution server 106, the presence information indicating the information on the acquisition source of the newly-acquired video contents is transmitted to the presence server 102.

As described above, the status information notifying unit 204 periodically transmits the presence information on the user terminal 200 to the presence server 120, so that the presence server 102 can transmit the presence information to another registered user terminal 200.

(Status Information Acquiring Unit 206)

The status information acquiring unit 206 acquires the presence information on at least one different user terminal 200 from the presence server 102. As stated above, the presence information on each user terminal 200 is transmitted to the presence server 102. In response thereto, the presence server 102 transmits the presence information to the predetermined user terminal 200 based on the registration information on the previously-registered user terminal 200. The status information acquiring unit 206 acquires the presence information transmitted from the presence server 102 and transfers the same to the display controlling unit 214 described later. In response thereto, the display controlling unit 214 can display the presence status of other user's user terminal 200 on the display.

In this manner, the user terminal 200 includes the status information notifying unit 204 and the status information acquiring unit 206, so that the presence information can be shared among multiple user terminals 200. For example, by way of the example shown in FIG. 1, the status information notifying unit 204 of the user A's terminal 200A transmits the presence information to the presence server 102 each time the presence status of the user A's terminal 200A changes. In response thereto, the presence server 102 can transmit the presence information on the user A's terminal 200A to the user B's terminal 200B and the user C's terminal 200C which register the user A's terminal 200A as presence information sharing terminal. Thus, the status information acquiring units 206 of the user B's terminal 200B and the user C's terminal 200C can periodically acquire the presence information on the user A's terminal 200A from the presence server 102. Similarly, the presence information on the user B's terminal 200B is also periodically transmitted to the user A's terminal 200A and the user C's terminal 200C and the presence information on the user C's terminal 200C is also periodically transmitted to the user A's terminal 200A and the user B's terminal 200B. Consequently, the presence information can be shared among the user terminals 200.

(Video Acquiring Unit 208)

The video acquiring unit 208 acquires predetermined video contents from the content distribution server 106. The video acquiring unit 208 can access the predetermined content distribution server 106 in response to a user's instruction and acquire the predetermined video contents such as video contents or broadcast contents, for example. The video contents acquired from the content distribution server 106 in this manner are transferred to the display controlling unit 214 described later. In response thereto, the display controlling unit 214 can reproduce the video contents acquired by the video acquiring unit 208 on the display.

Further, the video acquiring unit 208 according to the present embodiment can request the content distribution server 106 to acquire the video contents corresponding to a presence video when the presence video displayed on the display is selected by the user. Thus, when the user wants to view the video contents being currently viewed by another user, the user can view the typical video contents whose resolution is not reduced at the same time with his/her friend if the user selects the presence video displayed on the display. A flow of the video content acquisition processing when the user selects the presence video will be described later in detail with reference to the sequence diagrams.

The video acquiring unit 208 can request the content distribution server 106 to interrupt the acquisition of the predetermined video contents or to change the video contents to be acquired in response to a user's instruction. The kind or acquisition method of the video contents acquired by the video acquiring unit 208 is not limited to specific ones.

(Presence Video Acquiring Unit 210)

The presence video acquiring unit 210 acquires a predetermined presence video from the content distribution server 106. As stated above, the presence information acquired by the status information acquiring unit 206 contains information on the acquisition source of the video contents being currently reproduced at another user terminal 200. Further, the content distribution server 106 manages the presence video in addition to the typical video contents as stated above. Thus, the presence video acquiring unit 210 transmits a request of acquiring the presence information corresponding to the video contents being currently reproduced at another user terminal to the content distribution server 106 based on the information on the acquisition source of the video contents contained in the presence information. In response thereto, the content distribution server 106 can transmit the presence video to the user terminal 200.

As described above, the presence video acquiring unit 210 can acquire the presence video corresponding to the video contents being reproduced at each user terminal 200 from the content distribution server 106 based on the presence information acquired from each user terminal 200 via the presence server 102. The presence video acquired by the presence video acquiring unit 210 is transferred to the display controlling unit 214 described later. In response thereto, the display controlling unit 214 can reproduce the presence video acquired by the presence video acquiring unit 210 on the display. Consequently, the user can share the video contents being currently viewed by his/her friend without an additional operation of acquiring the video contents.

The presence video acquiring unit 210 can request the content distribution server 106 to interrupt the predetermined presence video in response to a user's instruction. The presence video acquiring unit 210 may change and transfer the format or compression rate of the acquired presence video to the display controlling unit 214 depending on the display performance of the display of the user terminal 200, for example.

(Communication Processing Unit 212)

The communication processing unit 212 establishes communication with another user terminal 200 via the SIP server 104 and the like. As stated above, the user can make call or messaging with a user of another user terminal 200 via the SIP server 104 by utilizing an IP phone connected to the user terminal 200 or IP phone incorporated in the user terminal 200.

When the user instructs to start a call or messaging with a specific user, the communication processing unit 212 requests the SIP server 104 to establish a session with the user terminal 200 of a designated user. When the user instructs to terminate the call or messaging, the communication processing unit 212 requests the SIP server 104 to interrupt the session.

When the presence video displayed on the display is selected by the user, the communication processing unit 212 can request the SIP server 104 to establish a session with the user terminal 200 reproducing the video contents. Thus, when the user wants to make communication with another user while sharing the video contents therewith, the user can select the presence video displayed on the display to start the communication. A flow of the communication processing when the presence video is selected by the user will be described later in detail with reference to the sequence diagrams.

(Display Controlling Unit 214)

The display controlling unit 214 displays various items of information or contents acquired by the respective functional configuration units on the display. The display controlling unit 214 can display the presence information acquired by the status information acquiring unit 206 on the display, for example. Thus, the user can recognize the current status of a user utilizing another user terminal 200.

Further, the display controlling unit 214 can display the video contents acquired by the video acquiring unit 208 on the display, for example. Thus, the user can acquire and view the predetermined video contents from the content distribution server 106. The display controlling unit 214 can display the presence video acquired by the presence video acquiring unit 210 on the display. Thus, the user can view the video contents being currently viewed by his/her friend on the display at the same time.

The display controlling unit 214 can control to display various items of information or contents such as a menu screen, display screens of various contents, execution screens of various programs, and setting screens of presence information on the display. An example in which the display controlling unit 214 displays the presence information or presence video on the display will be exemplified in the explanations of the sequence diagrams.

The display on which predetermined presence information or contents are displayed by the display controlling unit 214 is not necessarily provided in the user terminal 200 itself and may be provided in an externally-connected external display apparatus. For example, when a notebook-type personal computer or PDA is applied as user terminal 200, the display controlling unit 214 can display predetermined presence information or contents on a display provided in the notebook-type personal computer or PDA itself. For example, when a game device or desktop computer is applied as user terminal 200, the display controlling unit 214 can display predetermined presence information or contents on an externally-connected TV or display. The display assumes LCD (Liquid Crystal Display), organic EL (ElectroLumiescence) display and the like, for example, but is not limited thereto.

(Operation Input Unit 216)

The operation input unit 216 includes an operation unit such as touch panel, keyboard, mouse, buttons, switches, lever or dial. The user operates the operation unit to instruct the user terminal 200 to perform the processing operations (instruction to acquire the video contents, to acquire the presence information, or to start or terminate the communication session). The operation input unit 216 transmits the instruction information received from the user via the operation unit to the control unit 218. In response thereto, the control unit 218 controls the respective functional configuration units provided in the user terminal 200 and performs various functions desired by the user based on the instruction information transmitted from the operation input unit 216.

(Control Unit 218)

The control unit 218 is a calculation processing apparatus or control apparatus for controlling the entire user terminal 200, such as CPU (Central Processing Unit). The control unit 218 instructs the above respective functional configuration units of the user terminal 200 to perform predetermined processings in response to the instruction from the operation input unit 216.

There has been described above one example of the functional configuration of the presence information sharing apparatus 200 (user terminal 200) according to the present embodiment. The functional configuration shown in FIG. 2 is mainly based on various functions utilizing the presence information as one characteristic of the present embodiment and the functions provided in the presence information sharing apparatus 200 are not limited thereto. For example, the presence information sharing apparatus 200 may additionally include various functions such as broadcast receiving function, recording function, content editing function and imaging function in addition to the functional configuration units shown in FIG. 2.

4. PROCESSING SEQUENCE

A flow of various processings in the presence information sharing system 100 including the user terminal 200 having the above functional configuration will be described later with reference to the sequence diagrams.

[4-1. Processing of Acquiring Presence Video]

Figure 3:
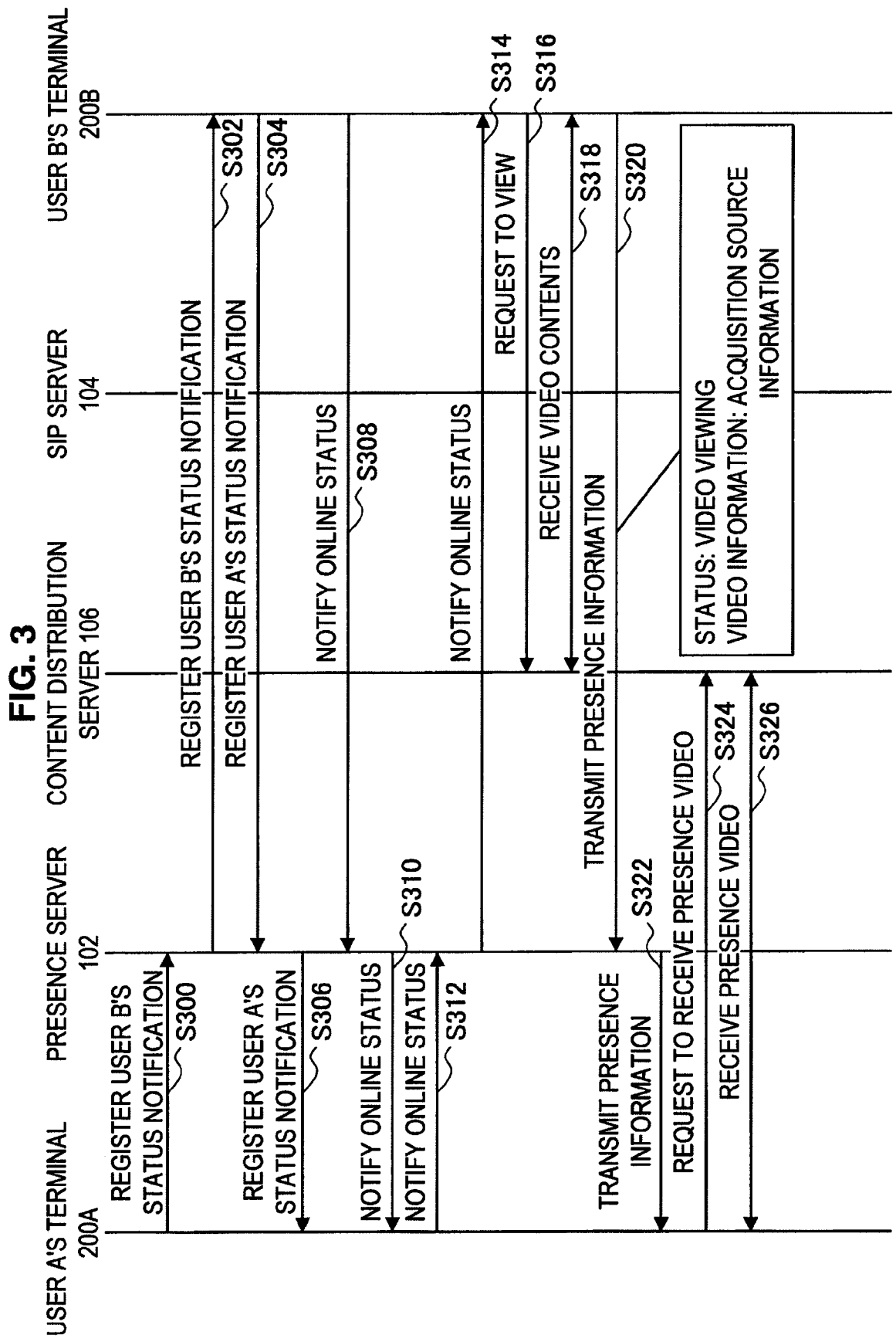
FIG. 3 is a sequence diagram showing one example of a flow of a presence video reception processing in the embodiment.

FIG. 3 is a sequence diagram showing one example of a flow of the presence video acquisition processing in the presence information sharing system 100 according to the present embodiment. In the example shown in FIG. 3, a flow of the processings between two user terminals 200 such as user A's terminal 200A and user B's terminal 200B is shown for convenient explanation, but similar processings are actually performed among three or more user terminals 200.

At first, as shown in FIG. 3, similarly as in the processing flow in the presence information sharing system in related art, the presence information indicating that the user A's terminal 200A and the user B's terminal 200B are on line is shared in the processings in steps 300 to 314. In other words, in step 300, the status notification registering unit 202 of the user A's terminal 200A registers the user B's terminal 200B as the user terminal 200 to share the presence information therewith in the presence server 102 in response to a user's instruction. In response thereto, the presence server 102 manages the information associating the user A's terminal 200A with the user B's terminal 200B. The presence server 102 may transmit the registration information to the user B's terminal 200B in step 302.

Similarly, in step 304 and step 306, the status notification registering unit 202 of the user B's terminal 200B registers the user A's terminal 200A as the user terminal 200 to share the presence information therewith in the presence server 102 in response to a user's instruction. Thus, the presence information can be shared between the user A's terminal 200A and the user B's terminal 200B. The processings in steps 300 to 306 are performed for the initial setting and the like, and do not need to be performed again after the presence information is once registered in the presence server 102.

Thereafter, for example, when the user B's terminal 200B is powered on, the status information notifying unit 204 of the user B's terminal 200B transmits the presence information indicating that the user B's terminal 200B is on line to the presence server 102 in step 308. In response thereto, the presence server 102 transmits the presence information received from the user B's terminal 200B to the user A's terminal 200A in step 310. Similarly, when the user A's terminal 200A is powered on, the status information notifying unit 204 of the user A's terminal 200A transmits the presence information indicating that the user A's terminal 200A is on line to the presence server 102 in step 312. In response thereto, the presence server 102 transmits the presence information received from the user A's terminal 200A to the user B's terminal 200B in step 314. Consequently, the user A utilizing the user A's terminal 200A can recognize that the user B's terminal 200B is currently on line. Similarly, the user B utilizing the user B's terminal 200B can recognize that the user A's terminal 200A is currently on line.

Steps 316 to 326 for the presence video acquisition processing flow as one characteristic of the present embodiment will be described below. In the following explanation, there will be exemplified a processing flow in which the user A's terminal 200A acquires a presence video when the user B views video contents, but similar processings are performed at the user B's terminal 200B also when the user A views video contents.

At first, in step 316, the video acquiring unit 208 of the user B's terminal 200B transmits a request of acquiring predetermined video contents to the content distribution server 106 in response to a user's instruction. In response thereto, the content distribution server 106 transmits the video contents corresponding to the request received from the user B's terminal 200B to the user B's terminal 200B. Thus, in step 318, the display controlling unit 214 of the user B's terminal 200B can display the video contents received from the content distribution server 106 on the display.

The status information notifying unit 204 of the user B's terminal 200B transmits the presence information containing the information on the acquisition source of the video contents being received in step 318 to the presence server 102. In response thereto, the presence server 102 transmits the presence information received from the user B's terminal 200B to the user A's terminal 200A in step 322.

Next, the presence video acquiring unit 210 of the user A's terminal 200A transmits the presence video acquiring request to the content distribution server 106 in step 324. In other words, the presence video acquiring unit 210 transmits the presence video acquiring request corresponding to the video contents to the content distribution server 106 based on the information on the acquisition source of the video contents contained in the presence information acquired in step 322.

In response thereto, the presence server 102 transmits the presence video requested by the user A's terminal 200A to the user A's terminal 200A in step 326. Thus, the display controlling unit 214 of the user A's terminal 200A can display the presence video received from the content distribution server

106 on the display. Consequently, the user A can view the video contents being currently viewed by the user B at the same time.

Through the above processing flow, the same video contents can be shared among the respective user terminals 200.

Figure 4:
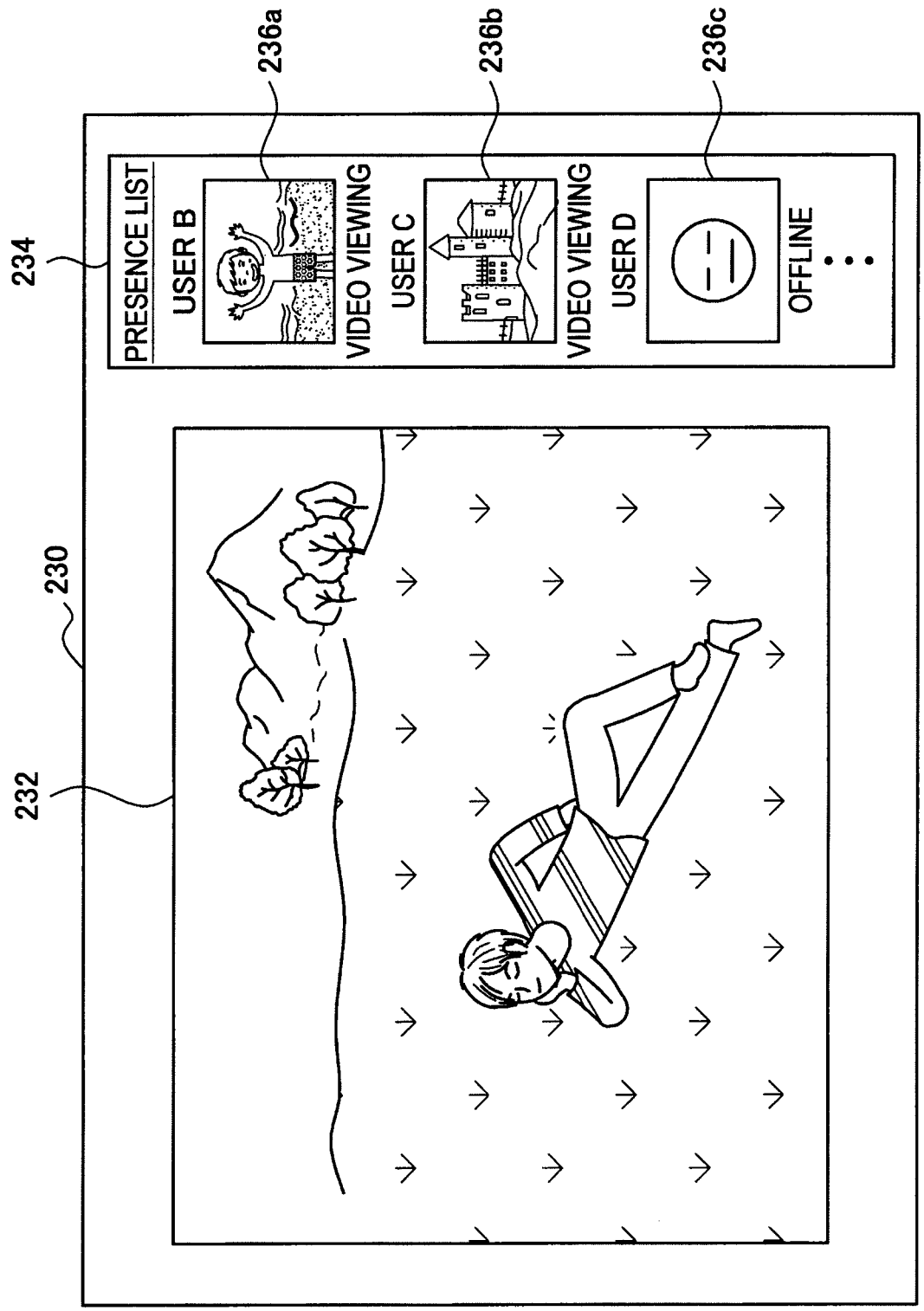
FIG. 4 is an explanatory diagram showing a display example of a presence video on a display 230 in the embodiment.

Next, there will be described a display example of the presence video displayed on the display by the display controlling unit 214 as a result of the processings shown in FIG. 3. FIG. 4 is an explanatory diagram showing a display example of the presence video on the display 230 by the display controlling unit 214. As shown in FIG. 4, the display controlling unit 214 displays a view content display region 232 and a presence information display region 234 on the display 230. The display controlling unit 214 displays the video contents being received from the content distribution server 106 in the video content display region 232. The display controlling unit 214 displays the presence information received from each user terminal 200 via the presence server 102 in the presence information display region 234. At this time, when the information on the acquisition source of the video contents is contained in the presence information, the display controlling unit 214 displays the presence video acquired by the presence video acquiring unit 210 in the presence information display region 234.

As shown in FIG. 4, the presence information display region 234 is configured with a plurality of presence information display frames 236 for displaying each user's presence information thereon. Thus, the display controlling unit 214 can display the acquired presence information on each presence information display frame 236 for each user. As stated above, the presence video acquired from the content distribution server 106 can be lowered in its resolution than typical video contents. Thus, the display controlling unit 214 can display the presence videos of multiple user terminals in the presence information display region 234 at the same time irrespective of a communication capability of the user terminal 200 or display specification of the display.

In the example shown in FIG. 4, the presence video corresponding to the video contents being currently viewed by the user B is displayed in a presence information display frame 236*a* and the presence video corresponding to the video contents being currently viewed by the user C is displayed in a presence information display frame 236*b*. Further, the fact that the user terminal 200 utilized by the user D is currently off line is displayed in a presence information display frame 236*c*. Consequently, the user A can recognize that the user terminal 200 utilized by the user D is currently off line, and can share the video contents being currently viewed by the user B and the user C at the same time with the user B and the user C.

The display example shown in FIG. 4 is merely one display example of the presence information by the display controlling unit 214 and the present invention is not limited to the display position, size and display contents shown in FIG. 4. The display controlling unit 214 can control to display the view content display region 232 and the presence information display region 234 from various viewpoints.

FIG. 5 is an explanatory diagram showing one example of display switching by the display controlling unit 214. As shown in FIG. 5, the display controlling unit 214 displays only the view content display region 232 on the display 230 when the user is viewing certain video contents at the user A's terminal 200A. Thus, the user can maximally display and view the video contents on the display 230.

When the user B starts to view certain video contents, the presence information containing the information on the acquisition source of the video contents is transmitted to the user A's terminal 200A in step 322 of FIG. 3 described above.

In response thereto, the presence video acquiring unit 210 of the user A's terminal 200A acquires the presence video of the video contents being viewed by the user B from the content distribution server 106. Thereafter, the display controlling unit 214 can reduce the view content display region 232 in its size and display the presence information display region 234 on the display 230 as shown in FIG. 5. As shown in FIG. 5, the presence video corresponding to the video contents being viewed by the user B is displayed in the presence information display frame 236*a* of the presence information display region 234. Thus, the user A can recognize that the user B is currently viewing the same video contents as the presence video being reproduced in the presence display frame 236*a*.

In the display status shown in FIG. 5, for example, when the user B starts to view other video contents, the display controlling unit 214 can switch the presence video to be displayed in the presence information display frame 236*a*. FIG. 6 is an explanatory diagram showing a display example of the display 230 of the user A's terminal 200A when the video contents being viewed by the user B are changed to other video contents.

As stated above, when the video contents being viewed by the user B are changed, the presence information containing the information on the acquisition source of the video contents is transmitted to the user A's terminal 200A in step 322 of FIG. 3 described above. In response thereto, the presence video acquiring unit 210 of the user A's terminal 200A acquires a new presence video from the content distribution server 106. Thus, the display controlling unit 214 can display the newly-acquired presence video in the presence information display frame 236*a* as shown in FIG. 6. At this time, the display controlling unit 214 can display the presence display frame 236*a* in a highlight or blinking manner or display a message to notify the user A of the fact that the user B has switched the video contents.

As described above, the user terminal 200 may not only display the presence information on another user terminal 200 but also directly utilize the presence information to display the acquired presence video on the display 230. Thus, each user can share the same video contents with other users without an additional operation of acquiring the video contents.

[4-2. Processing of Interrupting Video Contents]

Figure 7:
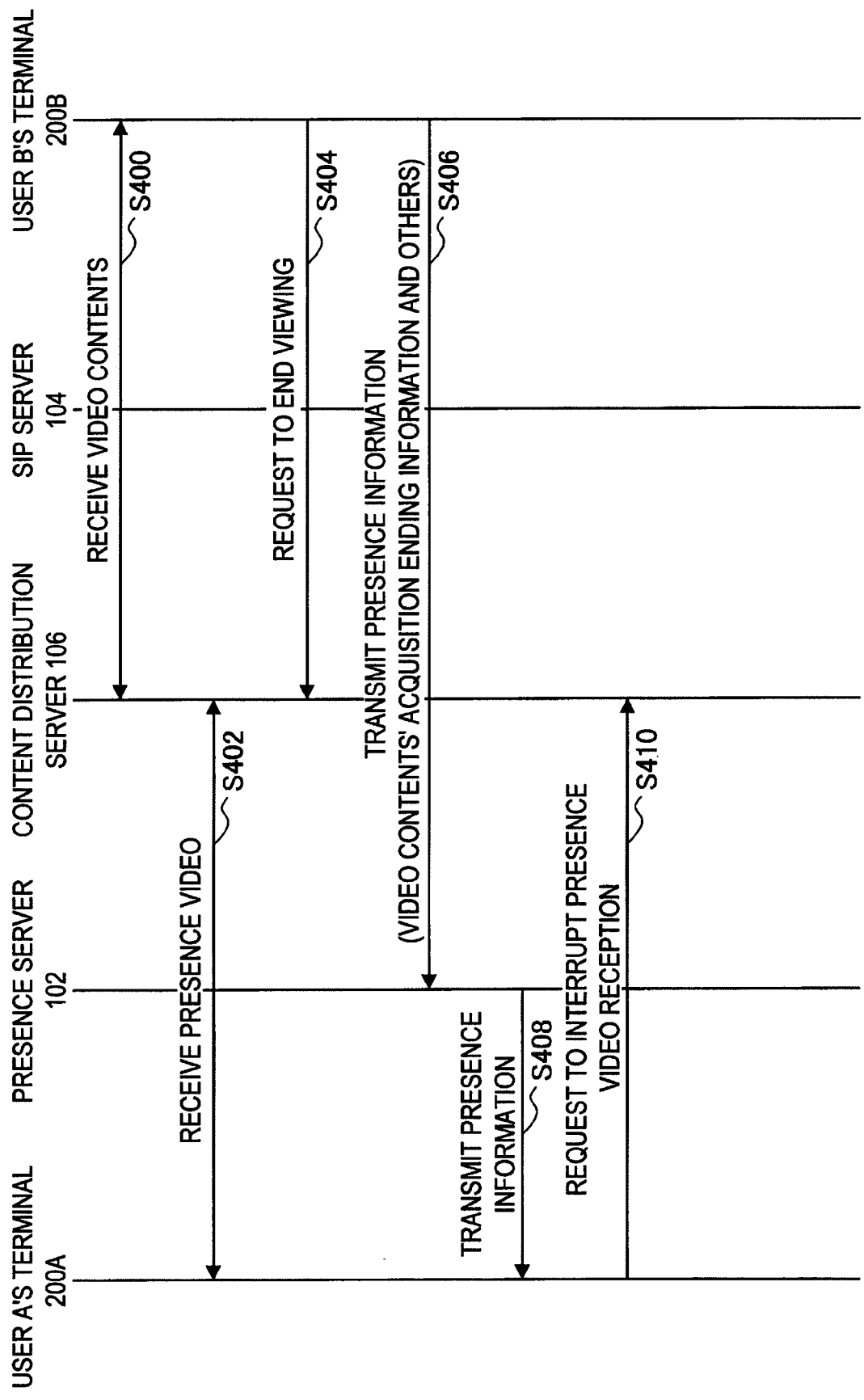
FIG. 7 is a sequence diagram showing one example of a processing flow when an instruction of finishing reproducing video contents is made in the embodiment.

Next, there will be described a processing flow when another user ends to view the video contents. FIG. 7 is a sequence diagram showing one example of a processing flow when the user B ends to view the video contents. There is described in the example shown in FIG. 7 a processing flow when the user B ends to view the video contents for convenient explanation, but similar processings are performed also when the user A ends to view the video contents.

In the example shown in FIG. 7, the same processing as step 318 of FIG. 3 described above is performed in step 400 and the same processing as step 326 of FIG. 3 is performed in step 402. In other words, the display controlling unit 214 of the user B's terminal 200B starts to reproduce predetermined video contents in step 400. The display controlling unit 214 of the user A's terminal 200A displays the presence video corresponding to the video contents being reproduced at the user B's terminal 200B on the display 230 in step 402.

Thereafter, when the user instructs to end viewing the video contents, the user B's terminal 200B transmits a request of ending to acquire the video contents to the content distribution server 106 in step 404. Thus, the display controlling unit 214 of the user B's terminal 200B ends to reproduce the video contents.

The status information notifying unit 204 of the user B's terminal 200B transmits the presence information indicating that the video contents have been ended to reproduce to the presence server 102 in step 406. In response thereto, the presence server 102 transmits the presence information received from the user B's terminal 200B to the user A's terminal 200A in step 408.

Thereafter, the user A's terminal 200A transmits a request of ending to acquire the presence video to the content distribution server 106 in step 410. Thus, the display controlling unit 214 of the user A's terminal 200A ends to reproduce the presence video corresponding to the user B's terminal 200B.

FIG. 8 is an explanatory diagram showing a display example of the display 230 by the display controlling unit 214 of the user A's terminal 200A when ending to reproduce the presence video through the processing sequence shown in FIG. 7. As shown in FIG. 8, when the user B ends to view the video contents, the display controlling unit 214 of the user A's terminal 200A ends the presence video being reproduced in the presence information display frame 236a. Further, the display controlling unit 214 displays the subsequent presence status of the user B's terminal 200B in the presence information display frame 236a. Consequently, in the example shown in FIG. 8, the user A can recognize that the user B's terminal 200B is currently on line but the video contents are not being reproduced.

As described above, the display controlling unit 214 of each user terminal 200 can appropriately switch the presence information or the presence video to be displayed in the presence information display frame 236 depending on the reproduction status of the video contents at another user terminal 200.

[4-3. Processing of Switching Video Contents]

Figure 9:
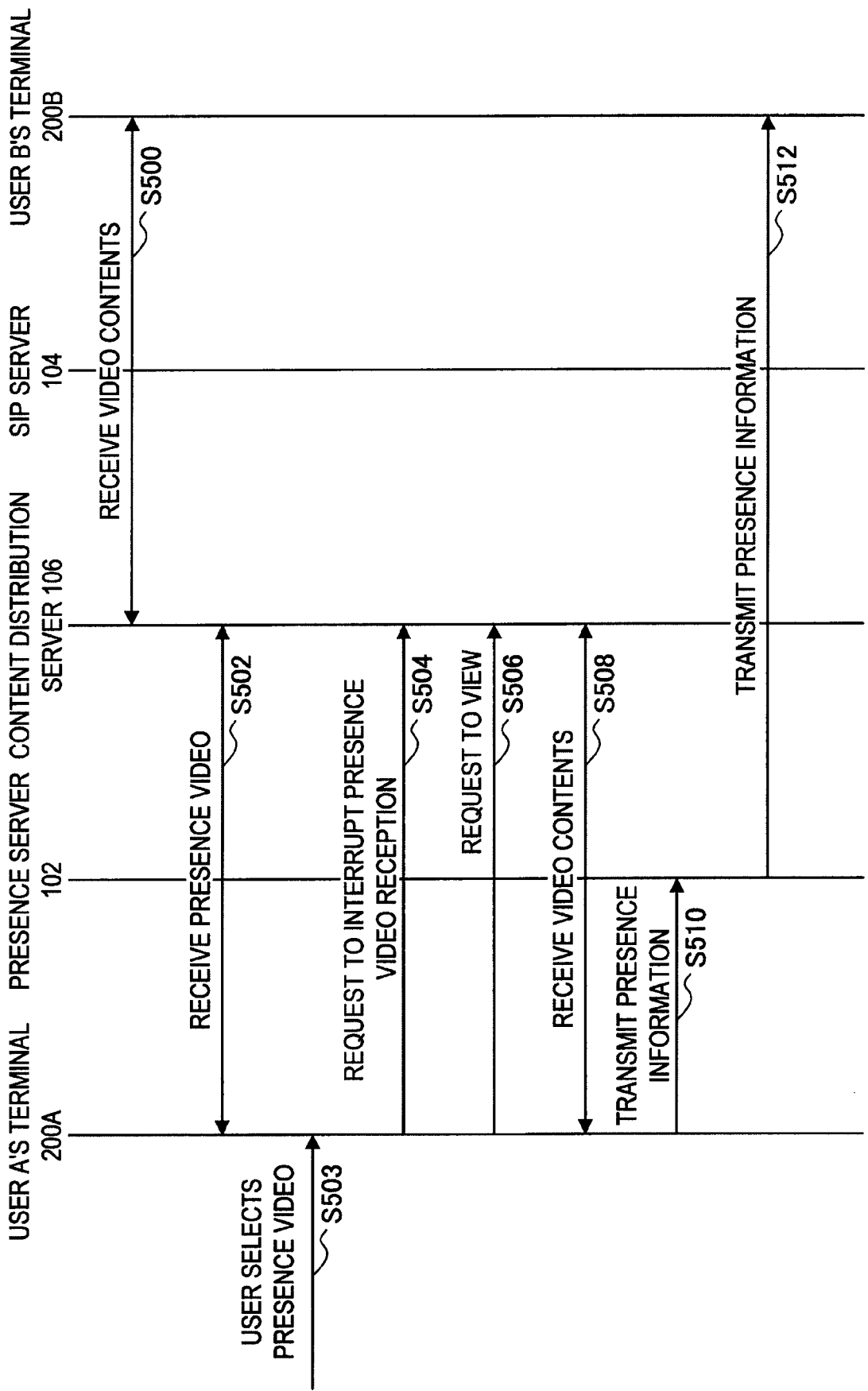
FIG. 9 is a sequence diagram showing one example of a processing flow of switching video contents when a presence video is selected by a user in the embodiment.

Next, there will be described a flow of a processing of switching the video contents to be reproduced in the view content display region 232 when the user selects the presence video displayed in the presence information display frame 236. FIG. 9 is a sequence diagram showing one example of a flow of the processing of switching the video contents when the user selects the presence video in the presence information sharing system 100 according to the present embodiment. A flow of the processings mainly based on the user A's terminal 200A is shown in the example of FIG. 9 for convenient explanation but similar processings are performed also at the user B's terminal 200B.

In the example shown in FIG. 9, the user B views predetermined video contents at the user B's terminal 200B in step 500. The display controlling unit 214 of the user A's terminal 200A displays the presence video corresponding to the video contents being reproduced at the user B on the display 230 in step 502.

In step 503, when the user A selects the presence video, the presence video acquiring unit 210 transmits a request of interrupting the presence video being currently received to the content distribution server 106 in step 503. The video acquiring unit 208 transmits a request of acquiring the video contents corresponding to the user-selected presence video to the content distribution server 106 in step 506.

In response thereto, the content distribution server 106 transmits the video contents requested from the user A's terminal 200A, that is, the video contents provided to the user B's terminal 200B to the user A's terminal 200A in step 508. Thus, the display controlling unit 214 of the user A's terminal 200A can display new video contents acquired from the content distribution server 106 in the view content display region 232 of the display 230. Consequently, the user A can view the video contents being viewed by the user B at the same time.

The status information notifying unit 204 transmits the presence information containing the information on the video contents being reproduced at the user A's terminal 200A to the presence server 102 in step 510. In response thereto, the presence server 102 transmits the presence information received from the user A's terminal 200A to the user B's terminal 200B in step 512. Consequently, the user B can recognize that the user A has started to view the same video contents.

The reception of the presence video is interrupted in step 504 in the example shown in FIG. 9, but the reception of the presence video does not necessarily need to be interrupted. For example, the display controlling unit 214 may switch only the video contents to be reproduced in the view content display region 232 and continuously display the presence video corresponding to the user B's terminal 200B in the presence information display region 234. FIG. 10 is an explanatory diagram showing a display example of the display 230 when the display controlling unit 214 switches the video contents to be reproduced in the view content display region 232.

As shown in FIG. 10, when the user selects the presence video displayed in the presence information display frame 236a, the display controlling unit 214 switches the video contents to be reproduced in the view content display region 232. Consequently, the video contents to be reproduced in the view content display region 232 is the same as the presence video to be reproduced in the presence video display frame 236a. When the acquisition of the presence video is interrupted in step 504 of FIG. 9 described above, the display controlling unit 214 may maximally display only the view content display region 232 on the display 230.

As described above, when the user selects the presence video corresponding to the video contents being reproduced at another user terminal 200, the user terminal 200 can display the video contents corresponding to the selected presence video on the display 230. Thus, each user can easily view the video contents being viewed by another user when the user is interested in the video contents being viewed by another user or wants to communicate while viewing the video contents being viewed by another user at the same time.

[4-4. Communication Start Processing]

Figure 11:
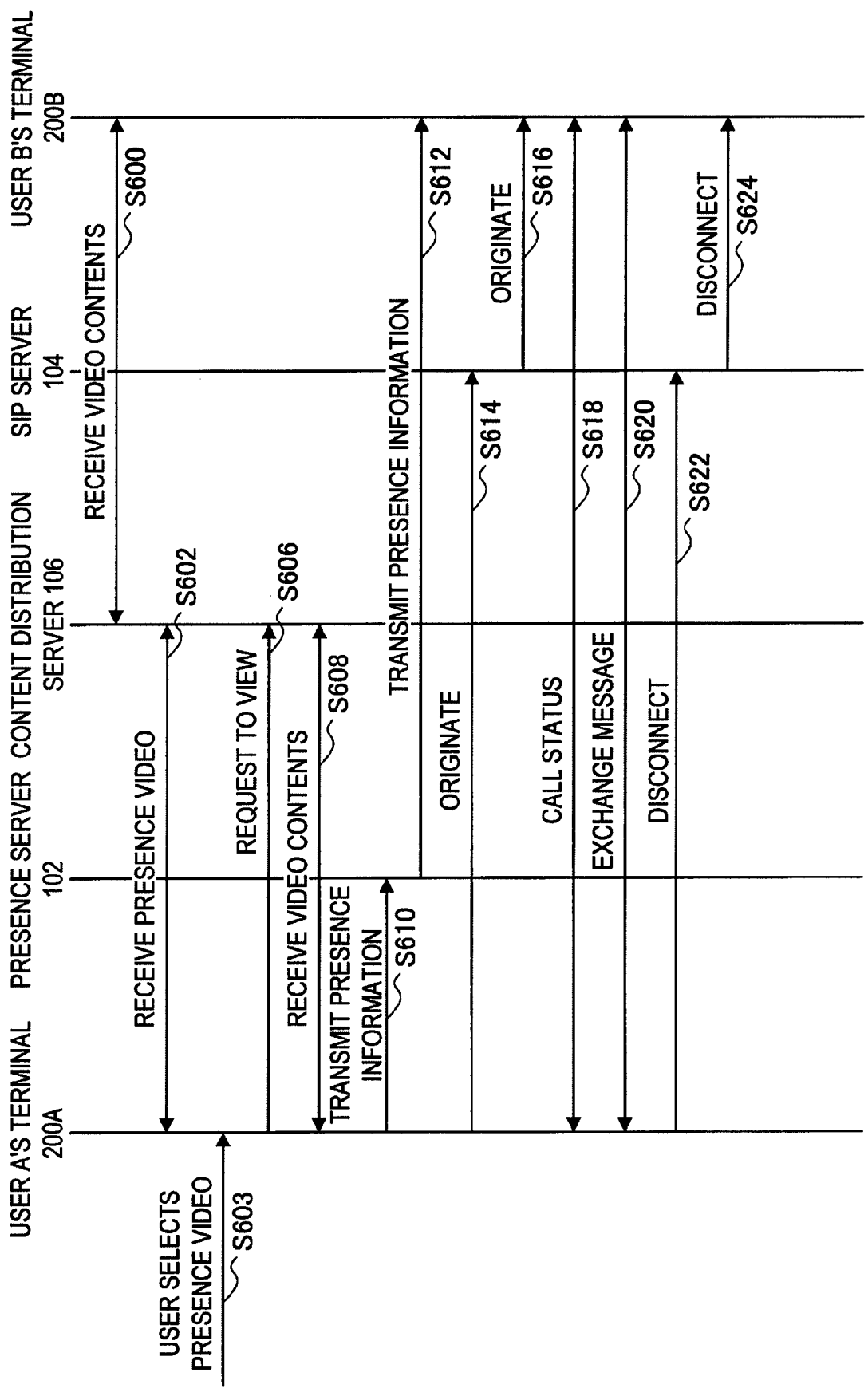
FIG. 11 is a sequence diagram showing one example of a flow of a communication establishment processing when a presence video is selected by a user in the embodiment.

Next, there will be described a flow of a processing of switching video contents and establishing communication when the user selects the presence video displayed in the presence information display frame 236. FIG. 11 is a sequence diagram showing one example of the flow of the processing of switching the video contents and establishing communication when the user selects the presence video in the presence information sharing system 100 according to the present embodiment. The flow of the processings mainly based on the user A's terminal 200A is shown in the example of FIG. 11 for convenient explanation, but similar processings are performed also at the user B's terminal 200B.

In the example shown in FIG. 11, the same processings as in steps 500 to 512 of FIG. 9 described above are performed in steps 600 to 612. In other words, the display controlling unit 214 of the user A's terminal 200A reproduces the same video contents as the video contents being reproduced at the user B's terminal 200B in the view content display region 232 of the display 230.

In the example shown in FIG. 11, in step 614, the communication processing unit 212 of the user A's terminal 200A requests the SIP server 104 to establish a session with the user B's terminal 200B. In response thereto, the SIP server 104 establishes a communication session between the user B's terminal 200B and the user A's terminal 200A in step 616.

Thus, the user A and the user B can communicate with each other via each user terminal 200. For example, the user A's terminal 200A and the user B's terminal 200B exchange an audio signal generated by each user as packet data in step 618. Thus, the user A and the user B can talk with each other while viewing the same video contents. Further, the user A's terminal 200A and the user B's terminal 200B can exchange text data input by each user in step 620. Thus, the user A and the user B can exchange messages while viewing the same video contents.

Thereafter, when the user wants to end the communication, the communication processing unit 212 of the user A's terminal 200A requests the SIP server 104 to end the session in response to a user's instruction in step 622. In response thereto, the SIP server 104 ends the communication session between the user A's terminal 200A and the user B's terminal 200B in step 624.

As described above, in the present embodiment, when the user selects a predetermined presence video, the video contents to be reproduced can be switched and further the communication with the party can be established. Consequently, the user can make communication such as call or messaging while sharing the same video contents with another user.

[4-5. Exchange Processing Among Multiple Users]

There has been described the flow of the processings between two user terminals 200 in each aforementioned processing sequence. As stated above, similar processings can be performed also among three or more user terminals 200 in the presence information sharing system 100 according to the present embodiment. When communication is being made among certain user terminals 200, the presence information on the communication status can be provided also to other user terminals 200 not in communication in the present embodiment.

Figure 12:
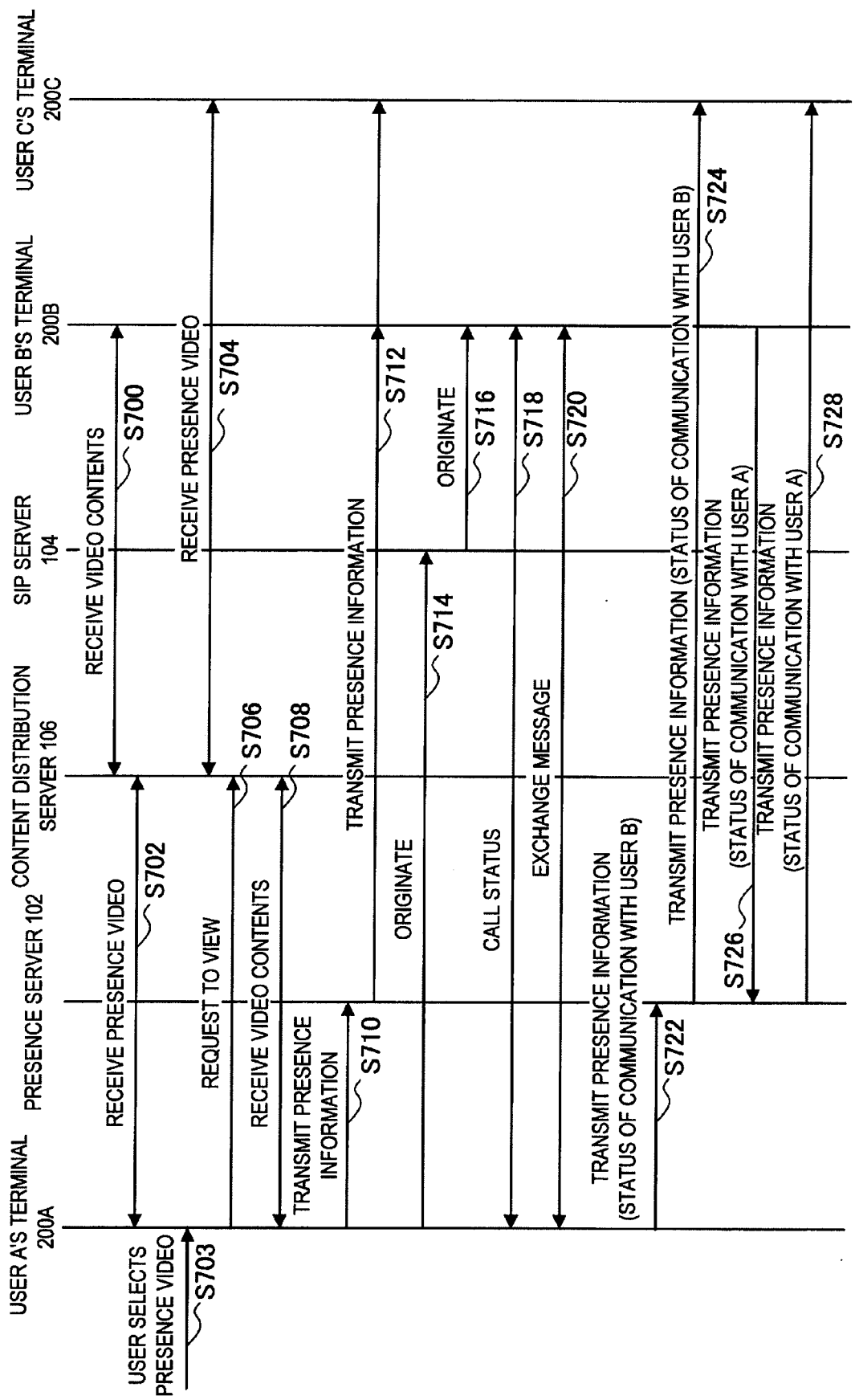
FIG. 12 is a sequence diagram showing one example of a processing flow among multiple user terminals 200 when a presence video is selected by a user in the embodiment.

FIG. 12 is a sequence diagram showing a processing flow when similar processings as in the processing sequence shown in FIG. 11 are performed in the case where the user A's terminal 200A, the user B's terminal 200B and the user C's terminal 200C are present.

In the example shown in FIG. 12, as compared with the example shown in FIG. 11, in step 704, the display controlling unit 214 of the user C's terminal 200C is displaying the presence video corresponding to the video contents being reproduced at the user B's terminal 200B on the display 230. In other words, the presence video acquiring unit 210 of the user C's terminal 200C acquires the presence information from the content distribution server 106 based on the acquisition source information on the video contents contained in the presence information on the user B's terminal 200B transmitted from the presence server 102. Thus, the use C can view the presence video corresponding to the video contents being viewed by the user B at the user B's terminal 200B at the same time.

When the user A starts to view the same video contents as the video contents being viewed by the user B in step 708, the user A's terminal 200A performs a processing in step 710. In other words, the status information notifying unit 204 of the user A's terminal 200A transmits the presence information containing the information on the video contents being reproduced at the user A's terminal 200A to the presence server 102. In response thereto, the presence server 102 transmits the presence information received from the user A's terminal 200A to the user B's terminal 200B and the user C's terminal 200C in step 712. Consequently, not only the user B but also the user C can recognize that the user A has started to view the same video contents as the user B's.

Next, there will be described a processing when the user A and the user B start communication in steps 714 to 720. In the presence information sharing system 100 according to the present embodiment, the presence information on the communication status can be provided also to the user C's terminal 200C not in communication.

In the example shown in FIG. 12, when the user A transmits a message to the user B, the status information notifying unit 204 of the user A's terminal 200A transmits the presence information containing the status information on communication with the user B's terminal 200B to the presence server 102 in step 722. In response thereto, the presence server 102 transmits the presence information received from the user A's terminal 200A to the user C's terminal 200C in step 724. In response thereto, the display controlling unit 214 of the user C's terminal 200C can display the presence information indicating that the user A has transmitted a message to the user C on the display 230. Consequently, the user C can recognize that the user A has transmitted a message to the user B.

Also when the user B transmits a message to the user A, the presence information containing the communication status information is transmitted to the user C's terminal 200C in steps 726 and 728.

As described above, also the user C not in actual communication can recognize the communication status between the user A and the user B. Consequently, when the user C is interested in the communication between the user A and the user B, he/she can easily participate in the communication.

The communication status information contained in the presence information may be text information or audio information on messages actually exchanged between users, or information only indicating that communication is being made.

There has been described above the detailed flow of the processings performed in the presence information sharing system 100 according to the present embodiment.

5. VARIANTS

The information contained in the presence information or the display control by the display controlling unit 214 is changed so that the aforementioned presence information sharing system 100 can be variously modified while including the above characteristics. In the following, variants of the presence information sharing system 100 will be described.

[5-1. Variant 1 (Example for Restricting Presence Information)]

There is assumed that the user wants to keep the viewing video contents in secrecy when providing the presence information to previously-registered friends. In such a case, the user can previously register the information for restricting from publicizing the video contents in the presence server 102, thereby not transmitting the information on the acquisition source of the video contents only to specific user terminals 200.

Figure 13:
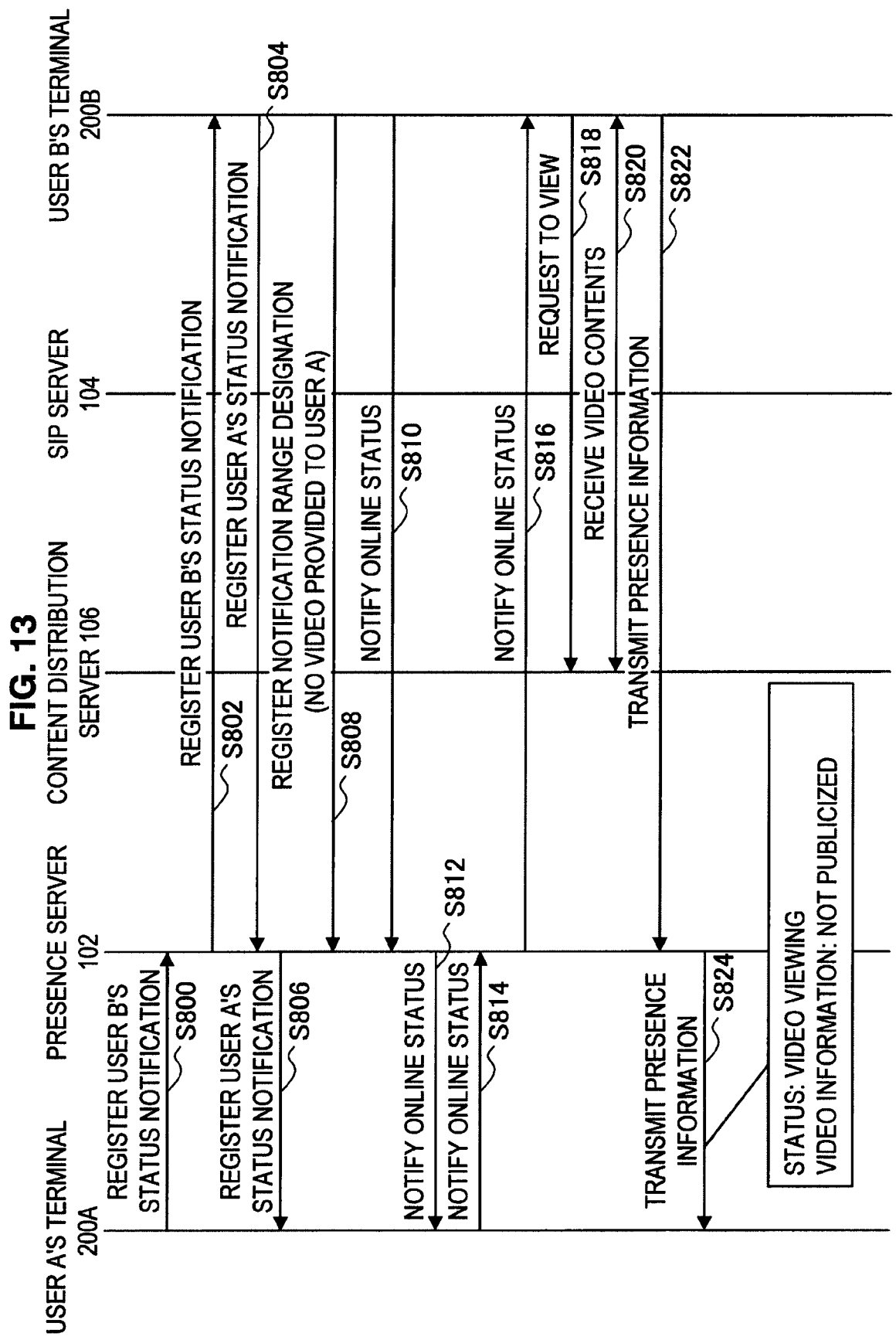
FIG. 13 is a sequence diagram showing a processing flow in the presence information sharing system 100 according to variant 1.

FIG. 13 is a sequence diagrams showing a processing flow in the presence information sharing system 100 according to variant 1 having the above characteristics. In the example shown in FIG. 13, the status notification registering unit 202 of the user B's terminal 200B instructs the presence server 102 to restrict from providing the information on the video contents to the user A's terminal 200A in response to a user B's instruction in step 808. Thus, when receiving the presence information containing the information on the acquisition source of the video contents from the user B's terminal 200B, the presence server 102 transmits the presence information not containing the acquisition source to the user A's terminal 200A.

In other words, when the user B's terminal 200B starts to reproduce the video contents in step 820, the status information notifying unit 204 of the user B's terminal 200B transmits the presence information containing the information on the acquisition source of the video contents to the presence server 102 in step 822.

In response thereto, the presence server 102 transmits the presence information not containing the acquisition source information to the user A's terminal 200A for which the acquisition source information on the video contents is restricted to provide in step 824. Consequently, the presence video acquiring unit 210 of the user A's terminal 200A may not acquire the presence video corresponding to the video contents being reproduced at the user B's terminal 200B. Thus, the display controlling unit 214 of the user A's terminal 200A displays only the fact that predetermined video contents are being reproduced on the display 230 as the presence status of the user B's terminal 200B.

Figure 14:
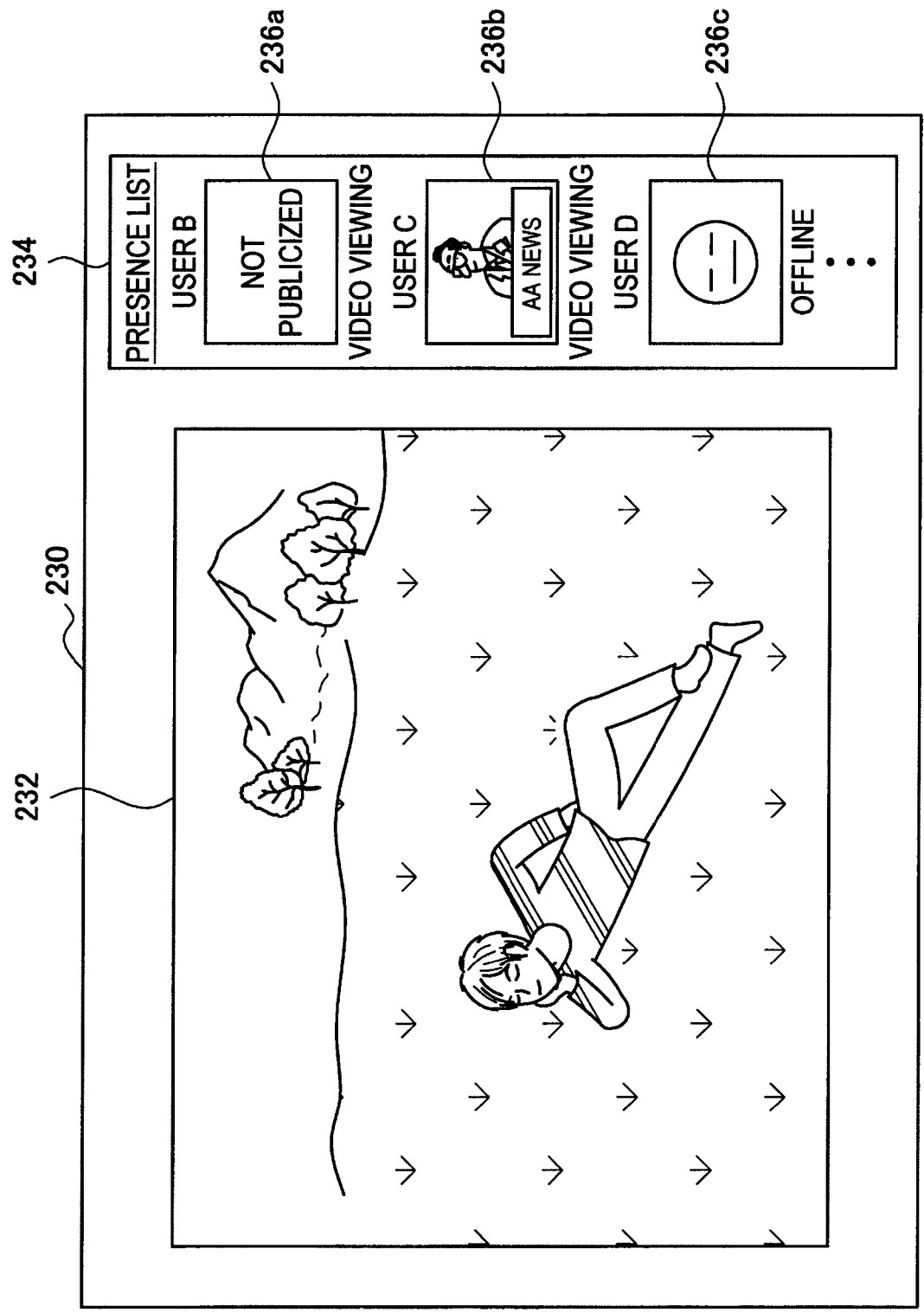
FIG. 14 is an explanatory diagram showing a display example of a presence video on the display 230 in variant 1.

FIG. 14 is an explanatory diagram showing a display example of the display controlling unit 214 of the user A's terminal 200A on the display 230 after step 824 of FIG. 13. As shown in FIG. 14, the presence video is not displayed in the presence information display frame 236a corresponding to the user B.

The restriction of the acquisition source information on the video contents can be registered for each user. Thus, in FIG. 13, when the acquisition source information is restricted only to the user A's terminal 200A, the typical presence information is transmitted to other user terminals 200 such as the user C's terminal 200C. In other words, when the user wants to view the video contents alone or does not want to publicize the video contents only to specific users, the user can utilize the presence information sharing system 100 according to variant 1.

[5-2. Variant 2 (Example for Classifying Displays of Presence Information)]

The display controlling unit 214 classifies the presence information from various viewpoints and displays the same on the display 230, thereby further improving usability. There will be described below a display control example of the display controlling unit 214 on the display 230 in the presence information sharing system 100 according to variant 2 having the above characteristics.

For example, as in variant 1 described above, when the presence information contains the information for restricting from publicizing the video contents, the display controlling unit 214 can control the display of the presence information display region 234 on the display 230 based on the information. For example, the display controlling unit 214 classifies and displays the presence information corresponding to the user terminal 200 publicizing the video contents, and the presence information corresponding to the user terminal 200 not publicizing the video contents on the display 230.

FIG. 15 is an explanatory diagram showing a display example when the display controlling unit 214 displays the presence information display region 234 on the display 230 based on the publicizing restriction information on the video contents according to variant 2. As shown in FIG. 15, the display 230 displays thereon the three presence information display regions 234a, 234b and 234c. The display controlling unit 214 displays the presence video corresponding to the user to which the publicizing of the acquisition source information on the video contents is not restricted and who is currently viewing the video contents in the presence information display region 234a. The display controlling unit 214 displays the presence status corresponding to the user who is currently viewing the video contents but to which the publicizing of the acquisition source information on the video contents is restricted in the presence information display region 234b. The display controlling unit 214 displays the presence status of the user terminal 200 being currently off line in the presence video display region 234c.

Thus, the user can easily recognize a user who desires to positively publicize the currently viewing video contents and to share the same video contents or a user wishing to communicate. Thus, the user can positively select the interested contents from among the presence videos displayed in the presence information display region 234a to share the video contents with the user or to communicate therewith. On the other hand, it is possible to easily recognize that the user displayed in the presence information display region 234b does not currently want to share the contents or to communicate.

Next, there will be described an example in which the display controlling unit 214 classifies and displays the presence information depending on the frequency of communication.

As stated above, in the presence information sharing system 100 according to the present embodiment, the user can make communication such as call or messaging with each user terminal 200. Thus, the user terminal 200 can store information on the communication history in a nonvolatile storage region or the like, for example. The display controlling unit 214 can utilize the communication history information to classify and display the presence information depending on the frequency of communication.

FIG. 16 is an explanatory diagram showing a display example of the display 230 on which the display controlling unit 214 classifies and displays the presence information depending on the frequency of communication. As shown in FIG. 16, the display 230 displays thereon the three presence information display regions 234d, 234e and 234f. The display controlling unit 214 displays the presence status of the user terminal 200 frequently making communication in the presence information display region 234d. The display controlling unit 214 displays the presence status of the user terminal 200 periodically making communication in the presence information display region 234e. Further, the display controlling unit 214 displays the presence status of the user terminal 200 not lately making communication in the presence information display region 234f.

Thus, the user can easily recognize the presence status of friendly users. Even a user not lately making communication can recognize the video contents being currently viewed, thereby picking the communication.

Next, there will be described an example in which the display controlling unit 214 classifies and displays the presence information based on the information on the category of the video contents contained in the presence information.

As stated above, the display controlling unit 214 can display the presence video corresponding to each user terminal 200 acquired by the presence video acquiring unit 210 in the presence information display region 234 of the display 230. The status information notifying unit 204 of the user terminal 200 can transmit the presence information containing the information on the category of the video contents to the presence server 102. For example, the status information notifying unit 204 can contain the category information and the like described in the metadata of the video contents acquired by the video acquiring unit 208 from the content distribution server 106 in the presence information. The display controlling unit 214 can classify and display the presence information based on the category information on the video contents contained in the presence information.

FIG. 17 is an explanatory diagram showing a display example of the display 230 on which the display controlling unit 214 classifies and displays the presence information based on the category information on the video contents contained in the presence information. As shown in FIG. 17, the display 230 displays thereon the three presence information display regions 234g, 234h and 234j. The display controlling unit 214 displays the presence video corresponding to the user terminal 200 reproducing the video contents in the category "sports" in the presence information display region 234g. The display controlling unit 214 displays the presence video corresponding to the user terminal 200 reproducing the video contents in the category "drama" in the presence information display region 234h. The display controlling unit 214 displays the presence status of the user terminal 200 not currently reproducing the video contents in the presence information display region 234j.

Thus, the user can easily recognize a user viewing the video contents in the interested category to share the video contents with the user or to communicate therewith.

As described above, the display controlling unit 214 according to variant 2 can classify and display the presence information from various viewpoints. The above example is one example for classifying and displaying the presence information in variant 2 and is not limited thereto. The display examples of the display shown in FIGS. 15 to 17 are exemplary for explaining the above characteristics, and the display position, size and the like of the presence information display region 234 are not limited thereto.

[5-3. Variant 3 (Example for Utilizing Presence Information and Distributing Pay Contents)]

Some video contents distributed by the content distribution server 106 may be distributed only to the users who have paid certain fee. The presence information sharing system 100 according to variant 3 can be utilized also for distributing the pay video contents.

For example, when a user is viewing predetermined pay video contents, the content distribution server 106 transmits the presence video having a reduced resolution to another user terminal 200 for a certain period of time. When being interested in the pay video contents, the user utilizing the user terminal 200 receiving the presence video can select the presence video and pay a free therefor to view the video contents corresponding to the presence video. In this case, a manager or the like of the content distribution server 106 can pay reward via a so-called affiliate system to the users viewing the pay video contents.

As described above, in the presence information sharing system 100 according to the present embodiment, each user terminal 200, the presence server 102 and the content distribution server 106 are associated with one another to exchange various items of information, thereby being applied to various service systems.

6. HARDWARE CONFIGURATION OF PRESENCE INFORMATION SHARING APPARATUS

Next, there will be described one example of a hardware configuration of the presence information sharing apparatus 200 (user terminal 200) having the above characteristics.

FIG. 18 is a block diagram showing one example of the hardware configuration of the presence information sharing apparatus 200 (user terminal 200) according to the present embodiment. The presence information sharing apparatus 200 according to the present embodiment mainly includes a CPU 901, a ROM 903, a RAM 905, a bridge 909, an interface 913, an input device 915, an output device 917, a storage device 919, a drive 921, a connection port 923 and a communication device 925.

The CPU 901 functions as a calculation processing device and a control device, and controls all or part of the operations inside the presence information sharing apparatus 200 according to various programs recorded in the ROM 903, the RAM 905, the storage device 919 or a removable recording medium 927. The CPU 901 can function as the above control unit 218. The ROM 903 stores therein programs or calculation parameters to be used by the CPU 901. The RAM 905 temporarily stores therein the programs to be used for execution of the CPU 901, or the parameters appropriately changing in their execution. These are interconnected via a host bus 907 configured with an internal bus such as CPU bus.

The input device 915 is an operation means operated by a user such as mouse, keyboard, touch panel, buttons, switches and lever. The input device 915 functions as the above operation input unit 216 and is configured with an input control circuit for generating an input signal based on the information input by the user by utilizing the operation means, and outputting the same to the CPU 901.

The output device 917 can display the above presence information or video contents, and includes a display device such as CRT display, liquid crystal display, plasma display and EL display. The output device 917 includes a device capable of aurally notifying the user of the acquired information, including an audio output device such as speaker.

The storage device 919 is a data storage device configured as one example of a storage unit of the presence information sharing apparatus 200 according to the present embodiment. The storage device 919 is configured with a magnetic storage device such as HDD (Hard Disk Drive), a semiconductor storage device, an optical storage device, a magnetooptical storage device and the like, for example.

The drive 921 is a reader/writer for recording medium, and is incorporated in or externally attached to the presence information sharing apparatus 200 according to the present embodiment. The drive 921 reads out the information recorded in the removable recording medium 927 such as mounted magnetic disk, optical disk, magnetooptical disk or semiconductor memory, and outputs the same to the RAM 905. The drive 921 can write the data in the mounted removable recording medium 927.

The connection port 923 is directed for directly connecting to an external connection device 929 such as USB port, optical audio terminal, IEEE1394 port, SCSI port and HDMI port. The external connection device 929 is connected to the connection port 923, so that the presence information, video contents and the like can be displayed on a display of the external connection device 929.

The communication device 925 is a communication interface configured with a communication device for connecting to the communication network 10, for example. The communication device 925 is a wired or wireless LAN, Bluetooth, a router for optical communication, a router for ADSL, a modem for various communications, and the like.

There has been described above one example of the hardware configuration capable of realizing the functions of the presence information sharing apparatus 200 according to an embodiment of the present invention. The respective constituents described above may be configured with general-purpose members or may be configured in hardware specific to the function of each constituent. Thus, the hardware configuration to be utilized can be appropriately changed depending on a technical level when the present embodiment is performed.

7. CONCLUSIONS

As described above, the video contents can be shared among the presence information sharing apparatuses 200 in the presence information sharing system 100 according to the present embodiment. In other words, the presence information sharing apparatus 200 can acquire the presence video corresponding to the video contents being reproduced in another presence information sharing apparatus 200 based on the information on the acquisition source of the video contents contained in the presence information. When the user selects the presence video, the presence information sharing apparatus 200 can acquire the video contents corresponding to the presence video from the content distribution server 106. When the user selects the presence video, the presence information sharing apparatus 200 can establish communication with the presence information sharing apparatus 200 of the selected user. In this manner, in the presence information sharing system 100 according to the present embodiment, the presence information sharing apparatus 200 can directly utilize the presence information to acquire the video contents being viewed by each user, thereby sharing the contents with each user.

It should be understood by those skilled in the art that various modifications, combinations, sub-combinations and alterations may occur depending on design requirements and other factors insofar as they are within the scope of the appended claims or the equivalents thereof.

For example, the presence information described in the above embodiment is one example for explaining the sharing of the presence video as a characteristic of the embodiment, and the information contained in the presence information is not limited to the above examples. For example, various items of information indicating a user's current status can be additionally contained in the presence information, of course.

The display examples of the display 230 shown in the diagrams are merely exemplary for explaining the above embodiment, and the display position, size, number, display contents and the like of the view content display region 232 or the presence information display region 234 are not limited thereto. The display controlling unit 214 can appropriately change the display position or size of the view content display region 232 or the presence information display region 234 depending on the user setting or initial setting, of course.

There has been described the communication establishment means by way of the session establishment via the SIP server 104 in the above embodiment, but the present invention is not limited thereto. For example, the communication establishment means may correspond only to instant messaging, and is not limited to a specific method as long as it can make call or messaging with a user terminal 200 of a party.

In the present specification, the steps described in the flowcharts or sequence diagrams include the processings performed in time series in the described order and the processings performed in parallel or individually, not necessarily performed in time series. Even the steps processed in time series can be appropriately changed in their order, of course.

The present application contains subject matter related to that disclosed in Japanese Priority Patent Application JP 2009-001158 filed in the Japan Patent Office on 6 Jan. 2009, the entire content of which is hereby incorporated by reference.

What is claimed is:

1. A presence information sharing apparatus comprising:
   a video acquiring unit for acquiring predetermined video contents from a content distribution server;
   a status information notifying unit for transmitting presence information containing acquisition source information on video contents acquired from the content distribution server to a presence server via a communication network;
   a status information acquiring unit for acquiring presence information transmitted by at least one another user from the presence server;
   a presence video acquiring unit for acquiring a video of video contents being viewed by the another user as a presence video from the content distribution server based on the acquisition source information contained in the presence information received by the status information acquiring unit; and
   a display controlling unit for displaying the video contents being acquired by the video acquiring unit and the presence video being acquired by the presence video acquiring unit on a display, wherein the display controlling unit displays, on the display, a view content display region for displaying therein the video contents being acquired by the video acquiring unit, and a presence information display region for displaying therein at least one presence video being acquired by the presence video acquiring unit,
   wherein the display controlling unit classifies the at least one presence video and displays the same in the presence video display region based on predetermined information contained in the at least one item of presence information acquired from the presence server,
   wherein the status information notifying unit contains category information on video contents acquired from the content distribution server in the presence information and transmits the same to the presence server via the communication network, and
   the display controlling unit displays the at least one presence video in the presence video display region for each category based on the category information contained in the at least one item of presence information acquired from the presence server.

2. The presence information sharing apparatus according to claim 1, wherein a resolution of the presence video is lower than a resolution of the video contents.

3. The presence information sharing apparatus according to claim 2, wherein when the predetermined presence video being displayed in the presence information display region is selected by a user, the video acquiring unit interrupts the acquisition of the video contents from the content distribution server and newly acquires video contents corresponding to the user-selected presence video from the content distribution server, and
   the display controlling unit displays the video contents newly-acquired by the video acquiring unit in the view content display region.

4. The presence information sharing apparatus according to claim 3, further comprising a communication processing unit for, when the predetermined presence video being displayed in the presence information display region is selected by a user, establishing a session necessary for communication with another user viewing video contents corresponding to the user-selected presence video.

5. The presence information sharing apparatus according to claim 4, wherein the communication processing unit transmits predetermined audio information or message information to a presence information sharing apparatus utilized by the another user in response to a user's instruction after the session is established.

6. The presence information sharing apparatus according to claim 5, wherein when the communication processing unit transmits the audio information or the message information to a predetermined user after the session is established, the status information notifying unit transmits presence information containing information on a status of communication with the predetermined user via the presence server to another user with which the session is not established.

7. The presence information sharing apparatus according to claim 3, wherein when the predetermined presence video being displayed in the presence information display region is selected by a user, the presence video acquiring unit interrupts the acquisition of the presence video from the content distribution server, and
the display controlling unit displays only the view content display region on the display.

8. The presence information sharing apparatus according to claim 1, wherein the display controlling unit displays a presence information display frame for displaying the presence video being acquired by the presence video acquiring unit for each user in the presence information display region.

9. The presence information sharing apparatus according to claim 5, wherein the display controlling unit classifies the at least one presence video being acquired by the presence video acquiring unit depending on the frequency at which the session is established by the communication processing unit, and displays the same in the presence video display region.

10. A presence information sharing method comprising the steps of:
acquiring predetermined video contents from a content distribution server;
transmitting presence information containing acquisition source information on video contents acquired from the content distribution server to a presence server via a communication network;
acquiring presence information transmitted by at least one another user from the presence server;
acquiring a video of video contents being viewed by the another user as a presence video from the content distribution server based on the acquisition source information contained in the presence information received in the status information acquiring step;
displaying the video contents being acquired in the video acquiring step and the presence video being acquired in the presence video acquiring step on a display;
displaying, on the display, a view content display region for displaying-therein the video contents being acquired, and a presence information display region for displaying therein at least one presence video being acquired;
classifying the at least one presence video and displaying the same in the presence video display region based on predetermined information contained in the at least one item of presence information acquired from the presence server;
containing category information on video contents acquired from the content distribution server in the presence information and transmitting the same to the presence server via the communication network; and
displaying the at least one presence video in the presence video display region for each category based on the category information contained in the at least one item of presence information acquired from the presence server.

11. A presence information sharing program, embodied on a non transitory computer readable medium, for causing a computer to execute:
a video acquisition processing of acquiring predetermined video contents from a content distribution server;
a status information notification processing of transmitting presence information containing acquisition source information on video contents acquired from the content distribution server to a presence server via a communication network;
a status information acquisition, processing of acquiring presence information transmitted by at least one another user from the presence server;
a presence video acquisition processing of acquiring a video of video contents being viewed by the another user as a presence video from the content distribution server based on the acquisition source information contained in the presence information received in the status information acquisition processing; and
a display control processing of displaying the video contents being acquired in the video acquisition processing and the presence video being acquired in the presence video acquisition processing on a display, wherein the display control processing displays, on the display, a view content display region for displaying therein the video contents being acquired by the video acquisition processing, and a presence information display region for displaying therein at least one presence video being acquired by the presence video acquisition processing,
wherein the display control processing classifies the at least one presence video and displays the same in the presence video display region based on predetermined information contained in the at least one item of presence information acquired from the presence server,
wherein the status information notification processing contains category information on video contents acquired from the content distribution server in the presence information and transmits the same to the presence server via the communication network, and
the display control processing displays the at least one presence video in the presence video display region for each category based on the category information contained in the at least one item of presence information acquired from the presence server.

12. A presence information sharing system comprising:
a content distribution server for distributing predetermined video contents;
a presence server for managing presence information; and
a presence information sharing apparatus, the presence information sharing apparatus including:
a video acquiring unit for acquiring predetermined video contents from the content distribution server;
a status information notifying unit for transmitting presence information containing acquisition source information on video contents acquired from the content distribution server to the presence server via a communication network;
a status information acquiring unit for acquiring presence information transmitted by at least one another user from the presence server;
a presence video acquiring unit for acquiring a video of video contents being viewed by the another user as a presence video from the content distribution server based on the acquisition source information contained in the presence information received by the status information acquiring unit; and a display controlling for displaying the video contents being acquired by the video acquiring unit and the presence video being acquired by the presence video acquiring unit on the display, wherein the display controlling unit displays, on the display, a view content display region for displaying therein the video contents being acquired by the video acquiring unit, and a presence information display region for displaying therein at least one presence video being acquired by the presence video acquiring unit, wherein the display controlling unit classifies the at least one presence video and displays the same in the presence video display region based on predetermined information contained in the at least one item of presence information acquired from the presence server, wherein the status information notifying unit contains category information on video contents acquired from the content distribution server in the presence information and transmits the same to the presence server via the communication network, and the display controlling unit displays the at least one presence video in the presence video display region for each category based on the category information contained in the at least one item of presence information acquired from the presence server.

* * * * *